(12) United States Patent
Stafford et al.

(10) Patent No.: US 11,539,445 B2
(45) Date of Patent: *Dec. 27, 2022

(54) METHODS AND APPARATUS FOR REDUCING POWER CONSUMPTION IN OPTICAL DEVICES

(71) Applicant: Charter Communications Operating, LLC, St. Louis, MO (US)

(72) Inventors: Roger Stafford, Thornton, CO (US); Matthew Petersen, Highlands Ranch, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/341,373

(22) Filed: Jun. 7, 2021

(65) Prior Publication Data

US 2021/0367677 A1 Nov. 25, 2021

Related U.S. Application Data

(63) Continuation of application No. 16/816,206, filed on Mar. 11, 2020.

(51) Int. Cl.
*H04B 10/564* (2013.01)
*H04B 10/40* (2013.01)

(52) U.S. Cl.
CPC ........... *H04B 10/564* (2013.01); *H04B 10/40* (2013.01)

(58) Field of Classification Search
CPC .............................. H04B 10/564; H04B 10/40
USPC .......................................................... 398/135
See application file for complete search history.

(56) References Cited

U.S. PATENT DOCUMENTS

| 6,504,630 | B1* | 1/2003 | Czarnocha | H04B 10/0771 398/20 |
| 8,498,534 | B2* | 7/2013 | Hirth | H04J 14/0221 398/58 |
| 9,753,514 | B2* | 9/2017 | Hybertson | G06F 1/30 |
| 2006/0093356 | A1* | 5/2006 | Vereen | H04L 63/1408 398/33 |
| 2010/0260497 | A1* | 10/2010 | Yoon | H04B 10/272 398/38 |
| 2012/0087652 | A1* | 4/2012 | Horishita | H04L 12/287 398/9 |

(Continued)

*Primary Examiner* — Dalzid E Singh
(74) *Attorney, Agent, or Firm* — Straub & Straub; Michael P. Straub; Stephen T. Straub

(57) ABSTRACT

A customer premises device including an optical modem including at least one upstream laser is power controlled to provide one or more reduced power levels of service in response to a detected AC input power failure, and/or in response to control commands, e.g., from an optical line terminal (OLT). The commands control the customer premises device to switch to a reduced power consumption mode of operation. During the reduced power mode one or a few lasers are powered, e.g., on an intermittent but predictable basis. During normal operation mode each of the upstream lasers are powered. One or more receiver circuits are also powered off during reduced power mode operation in some embodiments. A schedule is used in some embodiments to control when one or more upstream lasers and/or receivers are powered. In some embodiments the schedule is determined based on information provided by the OLT.

20 Claims, 14 Drawing Sheets

(56) References Cited

U.S. PATENT DOCUMENTS

2012/0177361 A1\* 7/2012 Hirano ................ H04J 14/0282
398/1
2021/0409125 A1\* 12/2021 Wey ................... H04Q 11/0067

\* cited by examiner

NORMAL OPERATION

| COMPONENT | TIME | | | | | |
|---|---|---|---|---|---|---|
| | T1 | T2 | T3 | T4 | T5 | ... |
| UPSTREAM LASER 1 (UL 1) | ON | ON | ON | ON | ON | ON |
| OPTICAL RECEIVER 1 (OR1) | ON | ON | ON | ON | ON | ON |
| UPSTREAM LASER 2 (UL 2) | ON | ON | ON | ON | ON | ON |
| OPTICAL RECEIVER 2 (OR2) | ON | ON | ON | ON | ON | ON |
| UPSTREAM LASER 3 (UL 3) | ON | ON | ON | ON | ON | ON |
| OPTICAL RECEIVER 3 (OR3) | ON | ON | ON | ON | ON | ON |
| UPSTREAM LASER 4 (UL 4) | ON | ON | ON | ON | ON | ON |
| OPTICAL RECEIVER 4 (OR4) | ON | ON | ON | ON | ON | ON |

INTERMEDIATE POWER SAVINGS

| 402 → COMPONENT | 404 → TIME | 406 → | 408 → | 410 → | 412 → |
|---|---|---|---|---|---|
| 414 → | | | | | |
| 416 → | T1 | T2 | T3 | T4 | T5 | ... |
| 418 → UPSTREAM LASER 1 (UL 1) | ON | ON | ON | ON | ON | ... |
| 420 → OPTICAL RECEIVER 1 (OR1) | ON | ON | ON | ON | ON | ... |
| 422 → UPSTREAM LASER 2 (UL 2) | ON | OFF | ON | OFF | ON | ... |
| 424 → OPTICAL RECEIVER 2 (OR2) | ON | OFF | ON | OFF | ON | ... |
| 426 → UPSTREAM LASER 3 (UL 3) | OFF | OFF | OFF | OFF | OFF | ... |
| 428 → OPTICAL RECEIVER 3 (OR3) | OFF | OFF | OFF | OFF | OFF | ... |
| 430 → UPSTREAM LASER 4 (UL 4) | OFF | OFF | OFF | OFF | OFF | ... |
| 432 → OPTICAL RECEIVER 4 (OR4) | OFF | OFF | OFF | OFF | OFF | ... |

FIGURE 4

| FIGURE 6A |
| FIGURE 6B |

| FIGURE 7A | FIGURE 7B |

METHODS AND APPARATUS FOR REDUCING POWER CONSUMPTION IN OPTICAL DEVICES

RELATED APPLICATIONS

The present application is a continuation of U.S. patent application Ser. No. 16/816,206 filed on Mar. 11, 2020 which is hereby expressly incorporated by reference in its entirety.

FIELD

The present invention relates to optical communications systems, and more particularly, to methods and apparatus for reducing power consumption in optical devices including optical modems.

BACKGROUND

Optical communications networks are being increasingly used to offer greater data rates into residential premises. These optical modems have grown rapidly in deployed numbers from about 2015 and will soon be deployed in millions per year. A concern from energy saving advocates is the increased power consumption that these devices consume more power (typically 8 to 18 W) and have no power saving or standby modes compared with DOCSIS cable modems (typically 15-18) that do have significantly developed power saving modes (less than 8 W in standby).

The reason for continuously high power operation in optical modems is the need to have one LASER for each upstream wavelength to be active all of the time. Optical modems may use 1, 2, 4 or in the future more wavelengths, all requiring a separate and continuously powered LASER.

In the case of residential optical modems, power consumption is of particular concern in the case of power outages. Residential and/or commercial premises optical modems are often paired with a relatively small backup battery which is intended to supply power in the event of a power outage.

Given the amount of power drawn by the lasers in an optical modem, the amount of time a unit can continue to operate based on battery power is often in large part a function of the power requirements of the lasers being used in the optical modem for uplink communications.

In current systems, all lasers normally remain powered on at the same time to support uplink communications using multiple different wavelengths. Continuing to power the full set of lasers can drain a backup battery over time and limit the overall duration the optical modem can remain functional during a power outage. While receive circuitry also tends to draw power, receiver circuits often consume less power than the lasers since they simply detect optical signals rather than have to generate the light transmissions, e.g., laser light, used to communicate information.

In view of the above discussion it should be appreciated if methods and/or apparatus could be developed which could be used to increase the power efficiency of optical devices and particularly optical modems including two or more lasers.

SUMMARY

Various features relate to methods and apparatus reducing power consumption requirements of optical devices, e.g., optical modems including one, two or more than two lasers, e.g., each laser corresponding to a different frequency of light. In various embodiments an optical modem supports a full power mode of operation and one or more reduced power modes of operation.

In some embodiments, a single laser is used for upstream communications, and during normal mode the single laser if continuously powered on, while during one or more reduced power modes of operation, the single laser is intermittently powered on. In some embodiments, including a plurality of lasers for upstream communications, in the reduced power mode of operation, less than the full set of lasers, e.g., lasers used to support upstream communication to a network headend, are powered at a given time with some of the lasers being left unpowered. For further power savings, in some but not necessarily all embodiments some of the different optical receivers and corresponding receiver circuitry is powered down. Thus depending on the embodiment, a laser used for upstream communication is powered down and in some embodiments the corresponding downlink circuitry will also be powered down.

While a laser may be, and sometimes is, powered down during at least some period of time during power save mode of operation, the methods and apparatus still allow for device availability in at least some embodiments where detection of an off-hook condition of a telephone or other device at a customer premise is detected and trigger powering up of at least one laser and/or resumption of normal mode operation. In one such embodiment once an on-hook condition of the device, e.g., phone, which was detected going off hook during power saving mode operation, and thus triggering powering of the laser, is detected as going on hook power saving mode is resumed and the laser is powered off, e.g., for a period of time and/or according to a schedule.

By supporting power saving mode operation, the methods and apparatus of the invention allow for use of a backup battery which can be of a reasonable size for a residential application while still allowing for 24 hour availability for voice calls during power outages and/or emergencies. The methods and apparatus can also be used to facilitate reaching of voluntary small network equipment power consumption targets and/or government mandated power consumption requirements for residential device in the event they are implemented or already exist.

Significantly, while an optical network unit implemented in accordance with the invention may enter a power saving mode of operation, the ONU can remain registered with a network device such as an OLT in at least some embodiments. After an initial registration with an OLT, e.g., after power up, the ONU is able to support voice calls. In one such embodiment the OLT keeps the ONU registered even though it may temporarily cease to communicate with the ONU due to ONU power saving mode operation and depowering of the ONU's laser or lasers and/or optical receivers for a period of time. In such embodiments on powering up its laser or lasers and/or optical receiver(s), the ONU can proceed with communicating with the OLT and proceeding with a voice call without having to re-register. This allows for rapid voice call support even when an ONU switches s from power saving to powered operation in response to a device such as a phone going off hook allowing for rapid placement of calls, e.g., in emergencies, since re-registration can be avoided as compared to embodiments where an ONU needs to re-register after ceasing communication with an OLT, e.g., due to a laser or receiver being powered off.

In some embodiments 2, 3, 4 or more uplink lasers are used and fully powered during a normal full power mode of operation. Depending on the amount of energy savings and/or data transmission requirements in some embodiments different power saving modes may be supported. For example while landline or wire power is available from the power lines of a house but little data is to be transmitted, multiple lasers may remain powered but with some of the lasers being powered off. For example if three lasers are included in a modem and there is little data to transmit one of the lasers may be powered off for a medium power saving mode of operation. In cases where extreme power savings are desired, e.g., because of a power outage and the need to run on battery power or because there is an extended period of inactivity in which there is no or little upstream data to be transmitted, the number of lasers and corresponding receive circuits may be reduced to one laser/receive circuit pair with the other laser/receiver circuits being powered off and the time in which the lasers and/or transmit/receive circuits in the optical modem are powered on is controlled by a schedule. Thus in cases of maximum power saving, all the lasers and corresponding optical transmit circuits may be, and sometimes are, powered on and off based on a schedule. Information about the schedule on which a customer preemies device will have its lasers and/or circuits powered on and off is exchanged between the customer premises device implementing the power saving mode of operation and the optical line terminal (OLT) with which it interacts. In the case where the customer premises device initiates power saving mode operation, it will communicate schedule information to the OLT. In the case where a network headend device triggers implementation of a power save mode of operation due to planned network maintenance for some other reason, the OLT will communicate schedule information to the optical modem.

During an implemented power save mode of operation, the optical modem will power on one or more lasers and/or optical receivers in accordance with the schedule to be used.

Switching between the full power mode of operation and one or more of the reduced power modes of operation can be initiated by the customer premises device including the modem, e.g., in response to detecting a power outage requiring the device to operate on battery power. Alternatively, a low power mode of operation can be triggered by the customer premises device including the optical modem based on a lack of user activity and/or data to transmit. When a low power mode of operation is initiated by the customer premises device, the customer premises device communicates information to an upstream device, e.g., optical line terminal in a network headend such a cable network operator office, indicating that it will be operating in a low power mode of operation. In various embodiments the communicated information also indicates which lasers/receivers will be in operation and the schedule on which such operation will be implemented. Based on the received information the upstream optical terminal with which the optical modem interacts knows which laser and/or receivers will be powered on and the schedule at which such devices will be powered on. In this way the upstream device will know when it can transmit to the optical modem and on which frequency or frequencies it can communicate.

In the maximum power saving mode of operation power saving is achieved by turning off all but one upstream LASER, referred to as the primary laser, when traffic is not being sent upstream, the downstream receivers which are not in use are also powered down to further save power. The primary laser is also powered down most of the time during the maximum power saving mode of operation based on the schedule, but periodically powered back up according to the schedule. The transmit and receiving time-slots are predetermined based on the schedule which is also known to the Optical Line Terminal (OLT) in the head-end infrastructure which will interact with optical modem based on the schedule. A scheduled power-down, set by the OLT's scheduler, allows optical modem functions to be put to sleep for long intervals compared to the required up-time used to support a 'keep-alive' function, enabling power-saving while maintaining the ability to be rapidly brought out of standby by either by a user of the modem, an application using the modem, or a network controller, e.g., located at the network headend or integrated into the optical line terminal.

By reducing the power consumption required through the selective application of power to one or more lasers and/or receive circuits power consumption by an optical modem of a customer premises device can be reduced considerably and the amount of time which the device can operate on battery power can be extended considerably beyond the amount of time that would be possible if all lasers were maintained in a powered state of operation.

An method of operating a customer premises device including an optical modem including at least a first laser, in accordance with some embodiments, comprises: operating in a normal mode of operation in which the first laser is continuously powered on for upstream communications; detecting one of: i) a loss in main power availability or ii) a command to implement a power saving mode of operation; and switching to a first power saving mode of operation in response to: i) detecting a command to implement a power saving mode of operation or ii) detecting a loss of main power availability, said first power saving mode of operation being a mode of operation in which said first laser is powered off for at least a first period of time. An exemplary customer premises device, in accordance with some embodiments, comprises: a first laser for upstream communication; a first optical receiver for downstream communication; a power monitoring circuit configured to monitor main power availability; and a processor configured to: operate the customer premises device in a normal mode of operation in which the first laser is continuously powered on for upstream communications; detect one of: i) a loss in main power availability or ii) a command to implement a power saving mode of operation; and switch to a first power saving mode of operation in response to: i) detecting a command to implement a power saving mode of operation or ii) detecting a loss of main power availability, said first power saving mode of operation being a mode of operation in which said first laser is powered off for at least a first period of time.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 3 shows an exemplary normal schedule used for a normal mode of operation in which all of the lasers and receiver circuits in the optical modem are powered on during the full set of time slots in the schedule.

FIG. 4 shows a first reduced power schedule associated with a first reduced power mode of operation in which one laser/optical receiver pair is kept in a powered on state and various other lasers/receivers are powered on/off according to the schedule.

DETAILED DESCRIPTION

Figure 1:
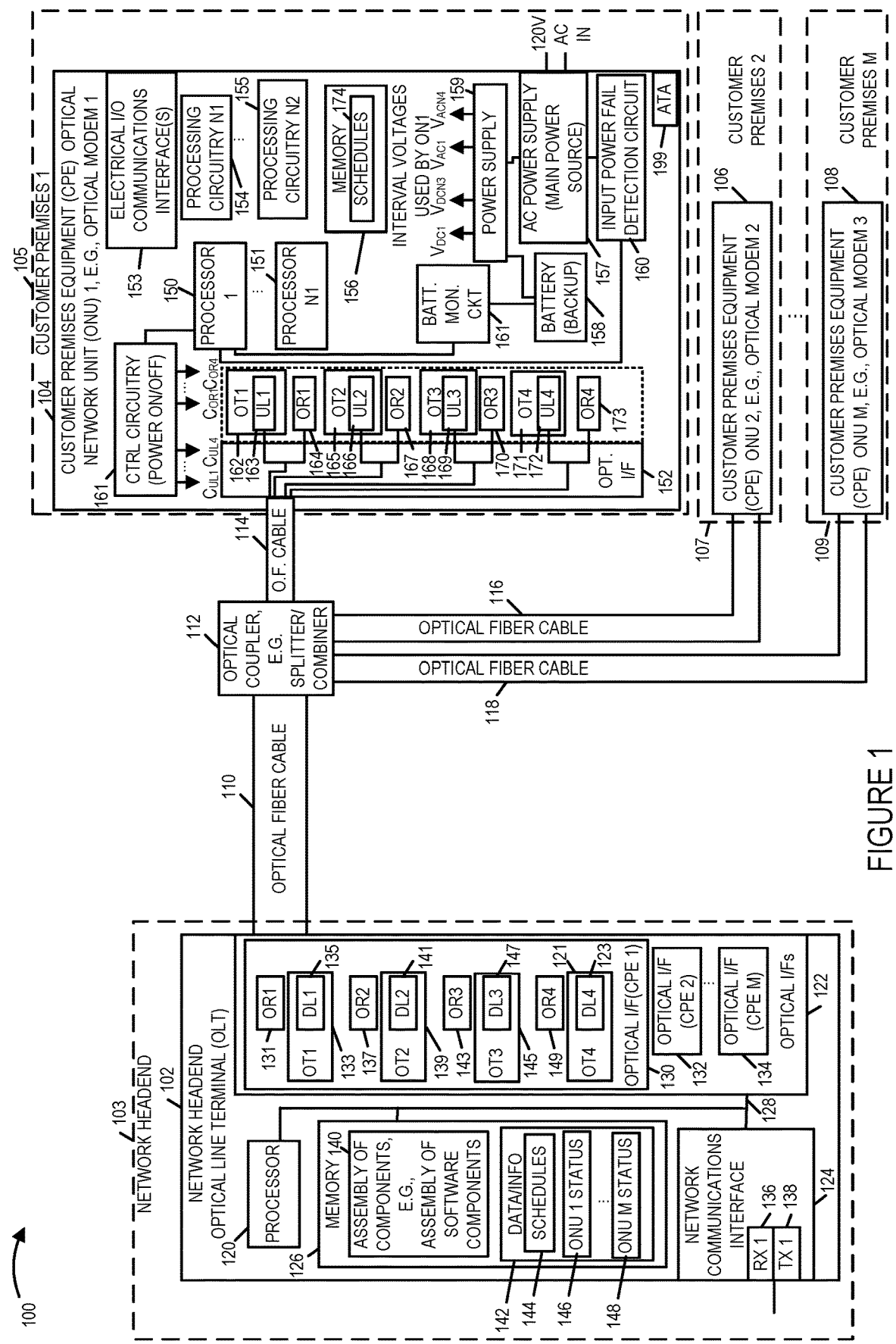
FIG. 1 is a drawing of an exemplary communications system including an optical line terminal (OLT) located at a network headend which is coupled to a plurality of customer premises which each include customer premises device that includes an optical modem and a processor.

FIG. 1 is a drawing of an exemplary communications system 100 including an optical line terminal (OLT) 102 located in a network headend 103, a plurality of optical network units (ONUs) (ONU 1 104, ONU 2 106, . . . , ONU M 108), each ONU located at a different customer premises (customer premises 1 105, customer premises 2 107, . . . , customer premises M 109), respectively, and an optical coupler 112, e.g., an optical splitter/combiner, coupled together as shown. Sometimes, the ONUs (104, 106, . . . , 108) are referred to as optical modems. In some embodiments, the ONUs (104, 106, . . . , 108) are each included as part of an optical modem. Optical fiber cable 110 couples the network headend OLT 102 to optical coupler 112. Optical fiber cable 114 couples ONU 1 104 to optical coupler 112. Optical fiber cable 116 couples ONU 2 106 to optical coupler 112. Optical fiber cable 118 couples ONU 3 108 to optical coupler 112. While the OLT is described as being positioned at the network headend it should be appreciated that the OLT may be, and sometimes is, located at another position external to a customer premises, e.g., at a location outside the customer premises at a location between the customer premises and the connection to the network headend. Thus is should be appreciated that depending on the embodiment the OLT can be located in a Headend and/or in an hardened cabinet located closer to the customer base with a large system including OLTs at various locations depending on the particular implementation. Remote OLT's (R-OLTS) which are small OLTs can reside in a node enclosure. These R-OLT's can be installed on the Hybrid Fiber-Coaxial (HFC) plant either on the strand or for underground plant located within cable vaults or "dog houses". Thus it should be appreciated that OLTs can be present at various locations in a system outside a customer premise where the ONU with which an OLT interacts is located.

Optical line terminal (OLT) 102 includes a processor 120, e.g., a CPU, optical interfaces (I/Fs) 122, a network communications interface 124, and memory 126, coupled together via a bus 128 over which the various elements may interchange data and information. Optical interfaces 122 includes a plurality of optical interfaces corresponding to different customer premises (optical interface 1 130, corresponding to customer premises (CP) 1 103 and ONU 1 104, optical interface 2 132, corresponding to CP 2 105 and ONU 2 106, . . . , optical interface M 134, corresponding to CP M 107 and ONU M 109.

Optical interface 1 130 of OLT 102 includes four optical receiver (OR)/optical transmitter (OT) pairs ((OR1 131, OT1 133), (OR2 137, OT2 139), (OR3 143, OT3 145), (OR4 149, OT4 121). Each of the optical transmitters (OT1 133, OT2 139, OT3 145, OT4 121) of optical interface 130 of OLT 102 includes a downstream, e.g. downlink, laser (DL1 135, DL2 141, DL3 147, DL4 123), respectively. OR1 131 of OLT 102 receives optical signals from OT1 162 of ONU 1 104. OT1 133 of OLT 102 transmits optical signals to OR1 164 of ONU 1 104. OR2 137 of OLT 102 receives optical signals from OT2 165 of ONU 1 104. OT2 139 of OLT 102 transmits optical signals to OR2 167 of ONU 1 104. OR3 143 of OLT 102 receives optical signals from OT3 168 of ONU 1 104. OT3 145 of OLT 102 transmits optical signals to OR3 170 of ONU 1 104. OR4 149 of OLT 102 receives optical signals from OT4 171 of ONU 1 104. OT4 121 of OLT 102 transmits optical signals to OR4 173 of ONU 1 104.

Network communications interface 124 includes receiver RX1 136 and transmitter TX 1 238. Network communications interface 124 couples the OLT 102 to other network nodes, e.g. in the headend, to other networks and/or the Internet. OLT 102 transmits signals including messages, e.g., control messages and/or user data messages, to other network nodes and/or to other devices, e.g., end node devices.

Memory 126 includes an assembly of components 140, e.g., an assembly of software components, e.g. software routines and/or software modules, and data/information 142. Data information 142 includes schedules 144 and ONU status information (ONU 1 status information 146, . . . , ONU M status information 148).

Optical network unit 1 (ONU 1 104) includes an optical interface 1 152. In some embodiments the ONU includes a single optical transmitter (OT)/receiver (OR) pair. However the number of OT/OR pairs can vary depending on the particular embodiment. In the FIG. 1 example for purposes of explaining the invention, an ONU 104 with four optical transmitter (OT)/optical receiver (OR) pairs ((OT1 162, OR1 164), (OT2 165, OR2 167), (OT3 168, OR3 170), (OT4 171, OR4 173) is shown. However, it should be appreciated that in other embodiments a ONU with a single OT/OR pair is used. In embodiments with a single OT/OR pair, the single OT and/or OR pair are powered on and/or based on the particular mode of operation being used with the OT/OR pair normally being powered on during normal mode operation but with the PT and/or OR being intermittently powered when operation in a power saving mode of operation.

In more advanced embodiments the number of OT/OR pairs powered at a given time may, and sometimes does, vary based on the mode of operation and/or a schedule used to control the supply of power to the devices in the ONU.

Each of the optical transmitters (OT1 162, OT2 165, OT3 168, OT4 171) of ONU 1 104 includes a upstream, e.g., uplink, laser (UL1 153, UL2 166, UL3 169, UL4 172), respectively. Sometimes upstream lasers are referred to as uplink lasers. In some embodiments, the optical transmitter and optical receivers are part of optical interface 152.

Optical network unit (ONU) 1 104 further includes a plurality of processors (processor 1 150, . . . , processor N1 151), e.g., a plurality of CPUs, an optical interface 152, a plurality of processing circuitry (processing circuitry 1 154, . . . , processing circuitry N1 155), memory 156 including schedules 174, an A/C power supply 157 (main power source), a battery 158 (back-up power source), a power supply 159, which generates a plurality of DC voltages (VDC1, . . . , VDCN3) used internally by the ONU 1 104 and a plurality of AC voltages (VAC1, . . . , VACN4) used internally by the ONU 1 104. While the ONU includes a battery backup in the exemplary illustrated embodiment which is shown as part of the ONU, it should be appreciated that in some embodiments the battery backup power source is external to the ONU. The processor of the ONU and the battery back up source, whether internal or external, has a communication channel with the processor of the ONU allowing the processor of the ONU to determine the overall health of the battery and if the battery has lost commercial, e.g., external line power.

ONU 1 104 further includes a battery monitoring circuit 161, and control circuitry 161 for controlling, e.g., under the direction of processor 1 150, power on/off state for various individual components included within ONU 1 104, including, e.g., upstream lasers, optical receivers, optical transmitters, processors, e.g., processor 2, . . . , processor N1 152, and processing circuitry (154, . . . 155). CPE ONU 1 104 further includes electrical I/O communications interfaces 153 for communication, e.g., via wired or wireless signals, with other devices or components at the customer premises, e.g., end node devices. ONU 1 104 further includes an analog telephone adaptor (ATA) 199, which can be, and sometime is, coupled to telephone, fax machine, or other device, located at the customer premises.

Figure 2:
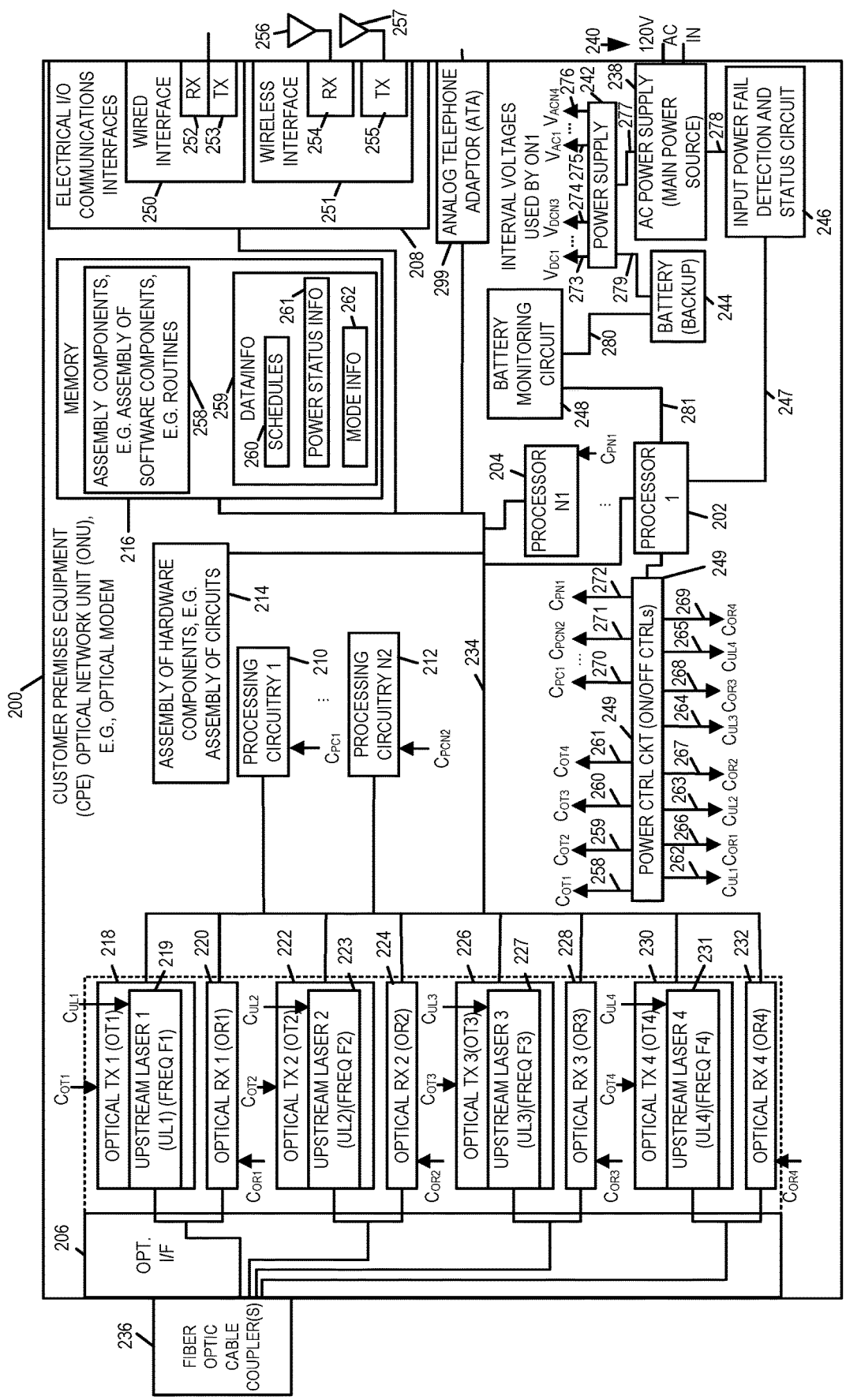
FIG. 2 shows an exemplary customer premises device implemented in accordance with the invention that includes an optical modem that supports a normal mode operation and one or more power saving modes of operation.

FIG. 2 shows an exemplary customer premises device 200 implemented in accordance with the invention that includes an optical modem that supports a normal mode operation and one or more power saving modes of operation. Customer premises device 200 is a customer premises equipment (CPE) optical network unit (ONU), e.g., an optical modem. Customer premises device 200 is, e.g., any of the ONUs (104, 106, . . . , 108) of system 100 of FIG. 1.

Customer premises device 200 includes fiber optic cable coupler(s) 236 coupled, e.g., connected, to optical interface 206. Optical interface 206 couples each of the optical transmitter/receiver pairs in customer premises device 200 to a fiber connected to one of the optical fiber couplers in coupler(s) 236. In some embodiments, the optical transmitter and optical receivers are considered to be part of the optical interface 206.

Customer premises device 200 includes four optical transmitter (OT)/optical receiver (OR) pairs ((OT1 218, OR1 220), (OT2 222, OR2 224), (OT3 226, OR3 2277), (OT4 230, OR4 231). Each of the optical transmitters (OT1 218, OT2 222, OT3 226, OT4 230) of customer premises device 200 includes an upstream, e.g., uplink, laser (UL1 219 using frequency F1, UL2 223 using frequency F2, UL3 227 using frequency F3, UL4 231 using frequency F4), respectively. In some embodiments, optical coupler(s) 236 includes a single optical coupler coupling the 4 optical TX/RX pairs onto a single optical fiber. In other embodiments, optical coupler(s) 236 includes a plurality of optical couplers, e.g. one for each optical TX/RX pair included in device 200, with each coupler corresponding to a different optical fiber. In some embodiments, the number of optical couplers used and number of optical fibers are determined based on the different frequencies used by the optical TX/RX pairs and the characteristics of the fiber(s) being used.

Customer premises device 200 further includes a plurality of processors (processor 1 202, . . . , processor N1 204), electrical I/O communications interfaces 208, a plurality of processing circuits (processing circuitry 1 210, . . . , processing circuitry 212), an assembly of hardware circuits 214, e.g., assembly of circuits, memory 216, and analog telephone adaptor (ATA) 299, coupled together and coupled to the electrical interfaces of optical transmitters (218, 222, 226, 228) and to the electrical interfaces of optical receivers (110, 224, 228, 232) via bus 234, over which the various elements may interchange data and information.

Customer premises device 200 further includes an AC power supply (main power sources 238, a power supply 242, a battery 244 (back-up power source), an input power fail detection and status circuit 246, a battery monitoring circuit 248, and a power control circuit 249. AC power supply 238 receives 120 VAC In power 240, and outputs filtered power to power supply 242, via power cable 277. The battery 244 is coupled to power supply via power cable 279, providing the power supply 242 with a backup source of input power, e.g., to be used if AC power fails or is unacceptable. Power supply 242 generates a plurality of DC voltages (VDC1 273, . . . , VDCN3 274) to be used internally by various components of device 200. Power supply 242 also generates a plurality of AC voltages (VAC1 275, . . . , VACN4 276) to be used internally by various components of device 200. Input power fail detection and status circuit 278, which coupled to AC power source via link 278, monitors the input AC power to detect power status, e.g., present and acceptable, not present, out-of-spec, etc., and reports current status to the processor 202 via link 247. Battery monitoring circuit 248, which is coupled to battery 244 via sense leads 280, monitors the battery 248 to determine its status, e.g. current voltage and estimated remaining stored energy in the battery 244. Battery monitoring circuit 248 is coupled to processor 202 via link 281 and reports battery status information to the processor 202.

Power control circuit 249, under the control of processor 249 generates and sends power on/off control signals, e.g., to each of a plurality of individual components with customer premise device 200. Power on/off control signals (COT1 258, COT2 259, COT3 260, COT4 261) are used to control power to optical transmitters (218, 222, 226, 230), respectively. Power on/off control signals (CUL1 262, CUL2 263, CUL3 264, CUL4 265) are used to control power to upstream lasers (219, 223, 227, 231), respectively. Power on/off control signals (COR1 266, COR2 267, COR3 268, COR4 269) are used to control power to optical receivers (220, 224, 228, 232), respectively. Power on/off control signals (CPC1 270, ..., CPCN2 271) are used to control power to processing circuitry (210, ..., 212), respectively. Power on/off control signal CPN1 272 is used to control power to processor N1 204.

Electrical I/O communications interfaces 208 includes a wired interface 250 and a wireless interface 251. Wired interface 250 includes receiver 252 and transmitter 253. Wireless interface 251, e.g. a WiFi interface, includes wireless receiver 254 coupled to receive antenna 256 and wireless transmitter 255 coupled to transmit antenna 257. In some embodiments, the same antenna or same set of antennas is used for both transmit and receive.

Memory 216 includes assembly of components 258, e.g., an assembly of software components, e.g., routines, and data/information 259. Data/information 259 includes schedules 260, power status information 261, and mode information 262.

FIG. 3 shows an exemplary normal schedule 300 used for a normal mode of operation in which all of the lasers and receiver circuits in the optical modem are powered on during the full set of time slots in the schedule. First Column 302 identifies the component which is being power controlled to be on or off during different times in the schedule. Second column 304 shows on/off status for time interval T1. Third column 306 shows on/off status for time interval T2. Fourth column 308 shows on/off status for time interval T3. Fifth column 310 shows on/off status for time interval T4. Sixth column 312 shows on/off status for time interval T5.

First row 314 and second row 316 include column header identification information. Third row 318 includes information identifying the upstream, e.g., uplink, laser 1 (UL 1) is ON during each of the time slots (T1, T2, T3, T4, T5) during normal operation. Fourth row 320 includes information indication that optical receiver 1 (OR1) is ON during each of the time slots (T1, T2, T3, T4, T5) during normal operation. Fifth row 322 includes information identifying the upstream, e.g., uplink, laser 2 (UL 2) is ON during each of the time slots (T1, T2, T3, T4, T5) during normal operation. Sixth row 324 includes information indication that optical receiver 2 (OR2) is ON during each of the time slots (T1, T2, T3, T4, T5) during normal operation. Seventh row 326 includes information identifying the upstream, e.g., uplink, laser 3 (UL 3) is ON during each of the time slots (T1, T2, T3, T4, T5) during normal operation. Eighth row 328 includes information indication that optical receiver 3 (OR3) is ON during each of the time slots (T1, T2, T3, T4, T5) during normal operation. Ninth row 330 includes information identifying the upstream, e.g., uplink, laser 4 (UL 4) is ON during each of the time slots (T1, T2, T3, T4, T5) during normal operation. Tenth row 332 includes information indication that optical receiver 4 (OR4) is ON during each of the time slots (T1, T2, T3, T4, T5) during normal operation.

FIG. 4 shows a first reduced power schedule 400 associated with a first reduced power mode of operation in which one laser/optical receiver pair is kept in a powered on state and various other lasers/receivers are powered on/off according to the schedule. First reduced power schedule 400 is also referred to as intermediate power saving schedule. First Column 402 identifies the component which is being power controlled to be on or off during different times in the schedule. Second column 404 shows on/off status for time interval T1. Third column 406 shows on/off status for time interval T2. Fourth column 408 shows on/off status for time interval T3. Fifth column 410 shows on/off status for time interval T4. Sixth column 412 shows on/off status for time interval T5.

First row 414 and second row 416 include column header identification information. Third row 418 includes information identifying the upstream, e.g., uplink, laser 1 (UL 1) is ON during each of the time slots (T1, T2, T3, T4, T5, ...) during first reduced power operation. Fourth row 420 includes information indication that optical receiver 1 (OR1) is ON during each of the time slots (T1, T2, T3, T4, T5, ...) during first reduced power operation. Fifth row 422 includes information identifying the upstream, e.g., uplink, laser 2 (UL 2) is (ON, OFF, ON, OFF, ON, ...) during slots (T1, T2, T3, T4, T5, ...), respectively, during first reduced power operations. Sixth row 324 includes information indication that optical receiver 2 (OR2) is (ON, OFF, ON, OFF, ON, ...) during slots (T1, T2, T3, T4, T5, ...), respectively, during first reduced power savings. Seventh row 326 includes information identifying the upstream, e.g., uplink, laser 3 (UL 3) is OFF during each of the time slots (T1, T2, T3, T4, T5, ...) during first reduced power operation. Eighth row 328 includes information indication that optical receiver 3 (OR3) is OFF during each of the time slots (T1, T2, T3, T4, T5, ...) during first reduced power operation. Ninth row 330 includes information identifying the upstream, e.g., uplink, laser 4 (UL 4) is OFF during each of the time slots (T1, T2, T3, T4, T5, ...) during first reduced power operation. Tenth row 332 includes information indication that optical receiver 4 (OR4) is OFF during each of the time slots (T1, T2, T3, T4, T5, ...) during first reduced power operation.

Figure 5:
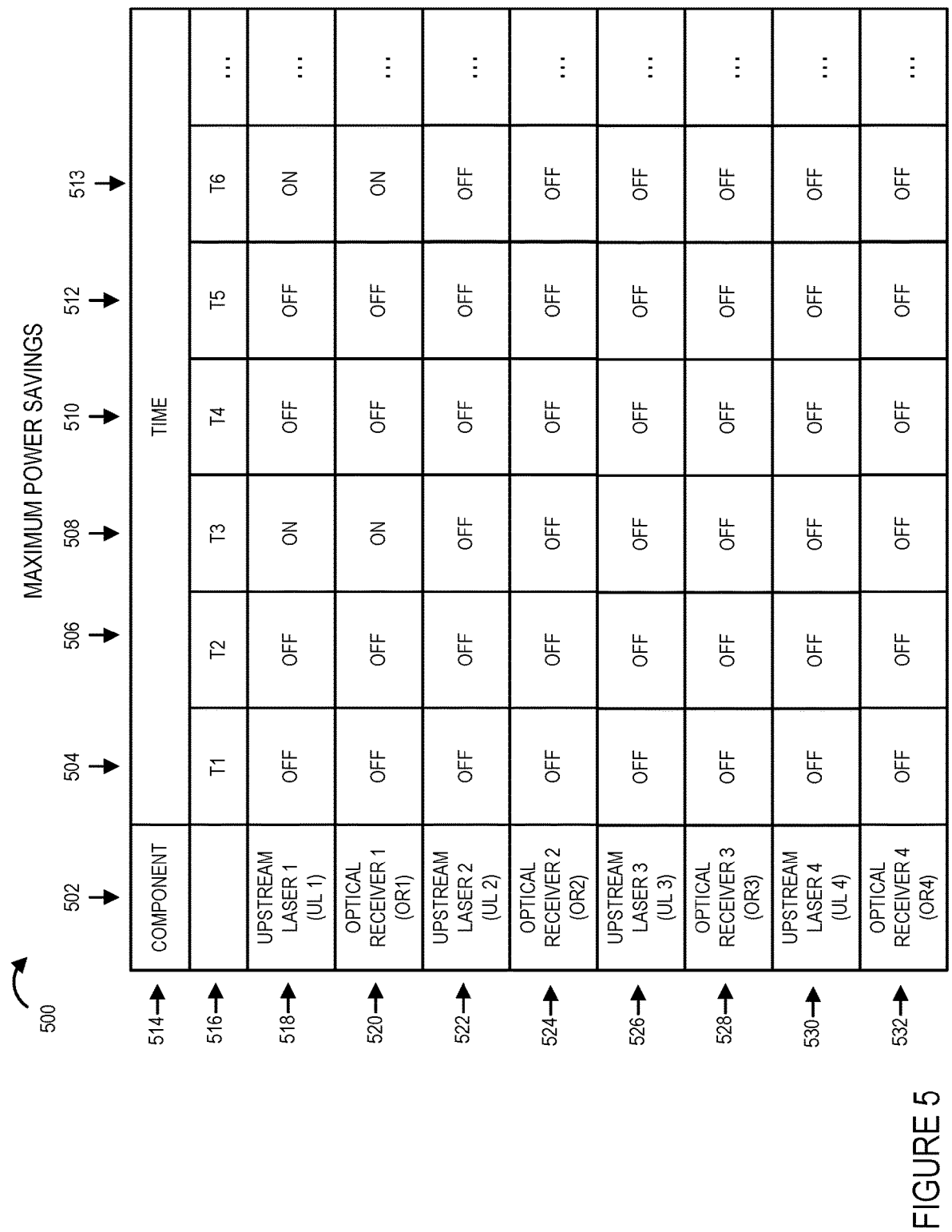
FIG. 5 shows a second schedule used to support a maximum power saving mode of operation in which a single laser and optical receiver are powered on for brief periods of time according to the schedule, with other lasers and optical receivers being powered off.

FIG. 5 shows a second schedule 500 used to support a maximum power saving mode of operation in which a single laser and optical receiver are powered on for brief periods of time according to the schedule, with other lasers and optical receivers being powered off. First Column 502 identifies the component which is being power controlled to be on or off during different times in the schedule. Second column 504 shows on/off status for time interval T1. Third column 506 shows on/off status for time interval T2. Fourth column 508 shows on/off status for time interval T3. Fifth column 510 shows on/off status for time interval T4. Sixth column 512 shows on/off status for time interval T5. Seventh column 513 shows on/off status for time interval T6.

First row 514 and second row 516 include column header identification information. Third row 518 includes information identifying the upstream, e.g., uplink, laser 1 (UL 1) is (OFF, OFF, ON, OFF, OFF, ON) during each of the time slots (T1, T2, T3, T4, T5, T6, ...) during maximum power saving operation. Fourth row 520 includes information indication that optical receiver 1 (OR1) is (OFF, OFF, ON, OFF, OFF, ON) during each of the time slots (T1, T2, T3, T4, T5, T6, . . . ) during maximum power saving operation. Fifth row 522 includes information identifying the upstream, e.g., uplink, laser 2 (UL 2) is OFF during each of the time slots (T1, T2, T3, T4, T5, T6, . . . ) during maximum power savings operation. Sixth row 524 includes information indication that optical receiver 2 (OR2) is OFF during each of the time slots (T1, T2, T3, T4, T5, T6, . . . ) during maximum power savings operation. Seventh row 526 includes information identifying the upstream, e.g., uplink, laser 3 (UL 3) is OFF during each of the time slots (T1, T2, T3, T4, T5, T6, . . . ) during maximum power savings operation. Eighth row 528 includes information indication that optical receiver 3 (OR3) is OFF during each of the time slots (T1, T2, T3, T4, T5, T6, . . . ) during maximum power savings operation. Ninth row 530 includes information identifying the upstream, e.g., uplink, laser 4 (UL 4) is OFF during each of the time slots (T1, T2, T3, T4, T5, T6, . . . ) during maximum power savings operation. Tenth row 532 includes information indication that optical receiver 4 (OR4) is OFF during each of the time slots (T1, T2, T3, T4, T5, T6, . . . ) during maximum power savings operation.

Figure 6A:
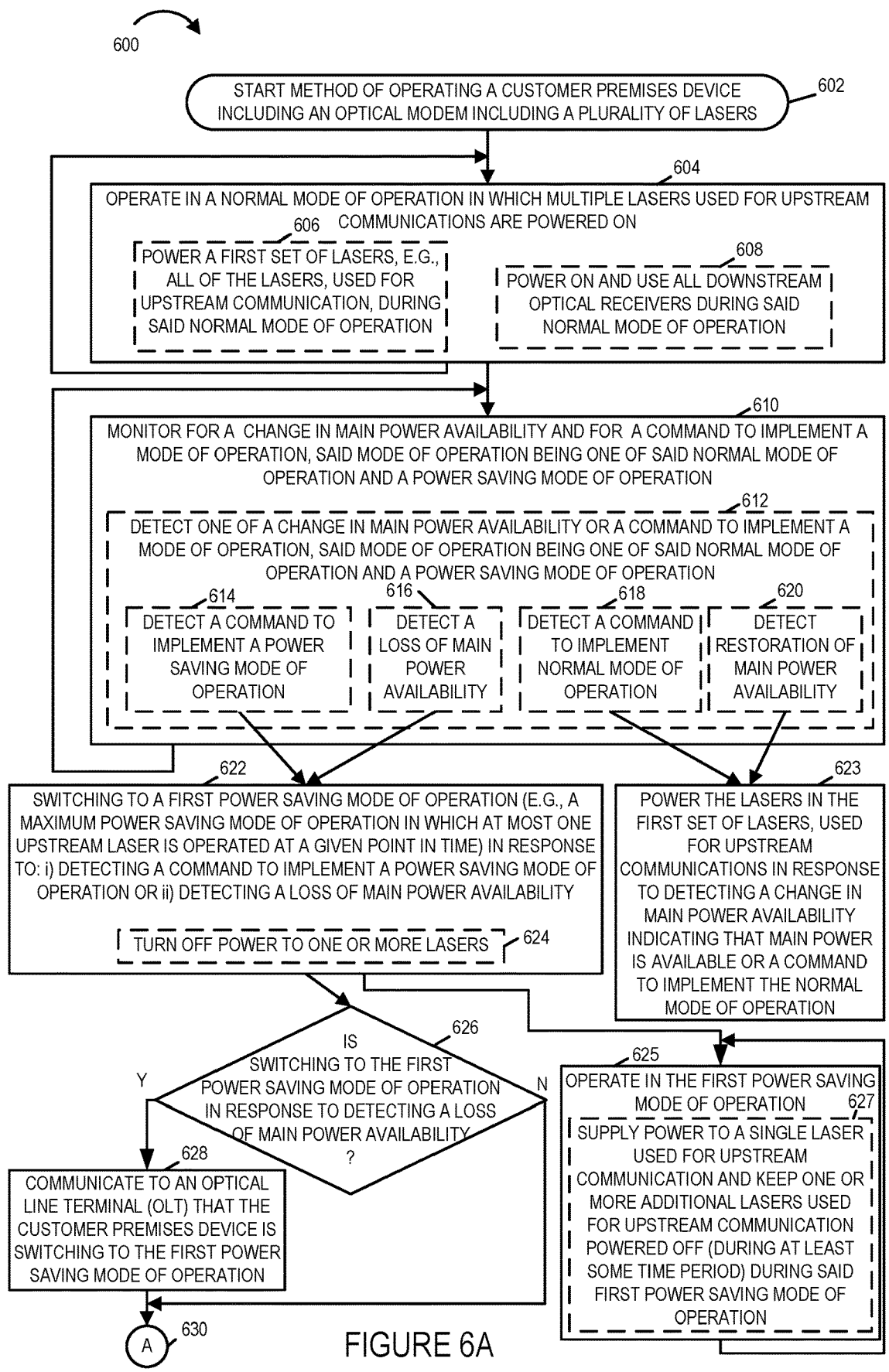
FIG. 6A is a first part of flowchart of an exemplary method of operating a customer premises device including an optical modem including a plurality of lasers in accordance with an exemplary embodiment.
Figures 6, 6B:
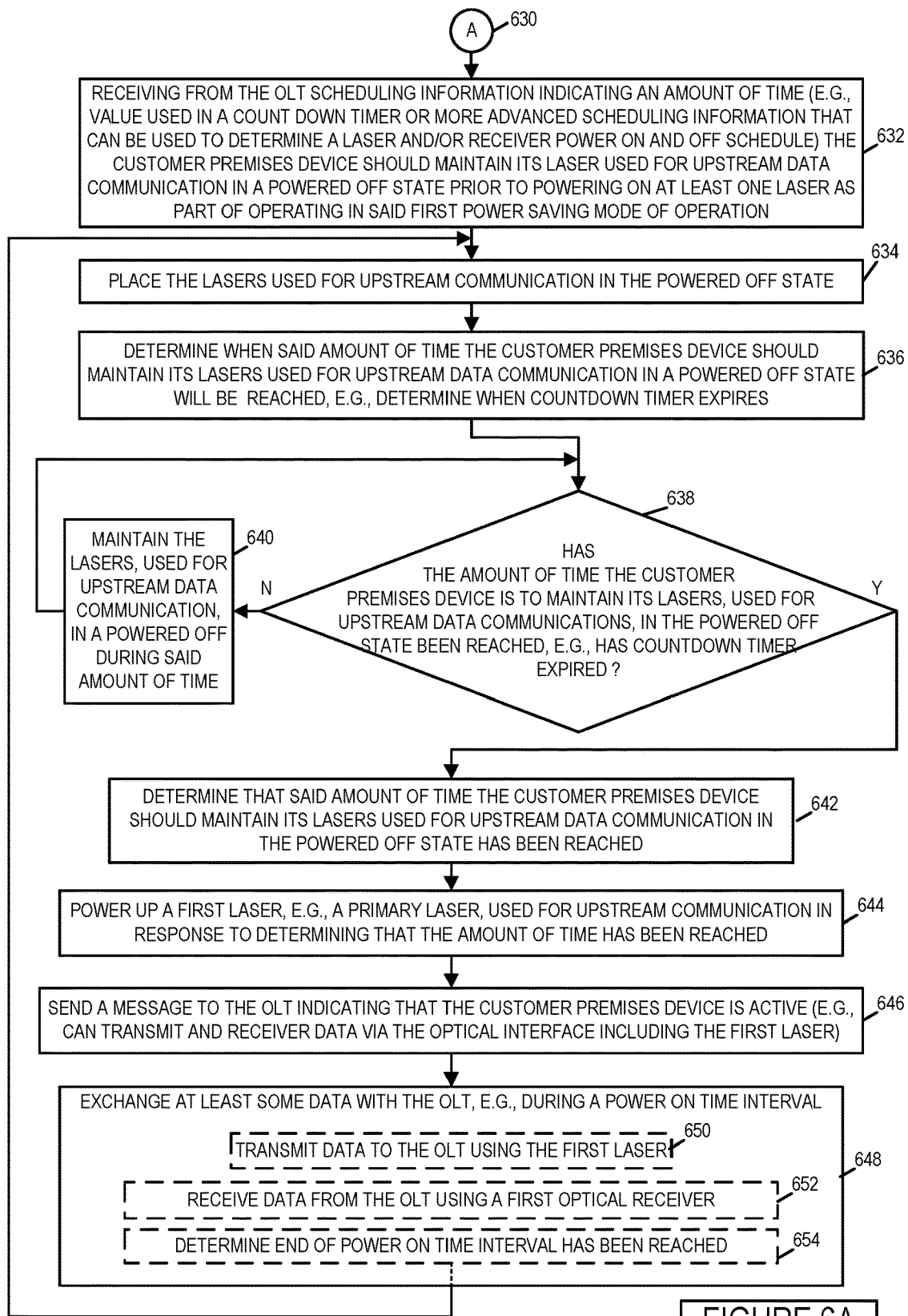
FIG. 6B is a second part of flowchart of an exemplary method of operating a customer premises device including an optical modem including a plurality of lasers in accordance with an exemplary embodiment.
FIG. 6 comprises the combination of FIG. 6A and FIG. 6B.

FIG. 6, comprising the combination of FIG. 6A and FIG. 6B, is a flowchart 600 of an exemplary method of operating a customer premises device including an optical modem including a plurality of lasers in accordance with an exemplary embodiment. In some embodiments the customer premises device implementing the flowchart 600 is an optical network unit (ONU), e.g., one of ONUs (104, 106, . . . , 108) of FIG. 1 or ONU 200 of FIG. 2 or a customer premises device including an ONU, implemented in accordance with an exemplary embodiment. Operation starts in step 602 in which the customer premises device including an optical modem including a plurality of lasers is powered on and initialized. Operation proceeds from start step 602 to step 604.

In step 604 the customer premises device is operated in a normal mode of operation in which multiple lasers used for upstream communications are powered on. In some embodiments, step 604 includes one or both of steps 606 and 608. In step 606 the customer premises device powers a first set of lasers, e.g. all of the lasers, used for upstream communications, during said normal mode of operation. In step 608 the customer premises devices powers on and uses all downstream optical receivers during said normal mode of operation. Operation proceeds from step 604 to step 610.

In step 610 the customer premises device monitors for a change in main power availability and for a command to implement a mode of operation, said mode of operation being one of said normal mode of operation and a power saving mode of operation. Step 610 may, and sometimes does, include step 612, in which the customer premises device detects one of a chain in main power availability or a command to implement a mode of operation, said mode of operation being one of a normal mode of operation and a power saving mode of operation. Step 612 includes step 614, 616, 618 and 620; one of steps 614, 616, 618 and 620 is performed during each iteration of step 612. In step 614 the customer premises device detects a command to implement a power saving mode of operation. In step 616 the customer premises device detects a loss of main power availability. In step 618 the customer premises device detects a command to implement a normal mode of operation. In step 620 the customer premises device detects restoration of main power availability.

Operation proceeds from step 614 or step 616 to step 622. In step 622 the customer premises device switches to a first power saving mode of operation, e.g., a maximum power saving mode of operation in which at most one upstream laser is operated at a given point in time, in response to: i) detecting a command to implement a power saving mode of operation or ii) detecting a loss of main power availability. Step 622 includes step 624 in which the customer premises device turns off power to one or more lasers. Operation proceeds from step 622 to step 625 and step 626.

In step 625 the customer premises device operates in the power saving mode of operation. Step 625 includes step 627, in which the customer premises device supplies power to a single laser used for upstream communication and keeps one or more additional lasers used for upstream communications powered off (during at least some time period) during said first power saving mode of operation.

In step 626 if the switching to the first power saving mode of operation is in response to detecting a loss of main power availability, then operation proceeds from step 626 to step 628; otherwise, operation proceeds from step 626, via connecting node A 630 to step 632.

Returning to step 628, in step 628 the customer premises device communicates to an optical line terminal (OLT) that the customer premises device is switching to the first power saving mode of operation. Operation proceeds from step 628, via connecting node A 630 to step 632.

In step 632, the customer premises device receives from the OLT scheduling information indicating an amount of time (e.g., a value used in a count down timer or more advance scheduling information that can be used to determine a laser and/or receiver power on and off schedule) the customer premises device should maintain its laser used for upstream data communication in a powered off state prior to powering one at least one laser as part of operating in said first power saving mode of operation. Operation proceeds from step 632 to step 634.

In step 634 the customer premises device places the lasers used for upstream communications in the powered off state. Operation proceeds from step 634 to step 636. In step 636 the customer premises device determines when said amount of time the customer premises device should maintain its lasers, used for upstream data communications, in a powered off state should be reached, e.g., the customer premises devices determines when the countdown time will expire. Operation proceeds from step 636 to step 638

In step 638 the customer premises device determines if the amount of time the customer premises device is to maintain its lasers, used for upstream data communications, in the power off state has been reached, e.g., determines if the counter timer has expired, and control operation as a function of the determination. If the determination of step 638, is that the amount of time has not been reached, then operation proceeds from step 638 to step 640; otherwise, operation proceeds from step 638 to step 642. In addition, in some embodiments the ONU monitors for an "off hook" signal from an analog telephone adaptor (ATA) coupled to or included in the ONU. If an off-hook condition is detected while the ONU is operating in power save mode it will trigger the lasers and optical receiver in the ONU to be powered on. Similarly if a transition from an off-hook to on-hook ATA transition is detected, in some embodiments this triggers a transition to power saving mode operation from normal mode operation in some embodiments, e.g., with the timer used to control the power off time of the laser and/or schedule being restarted.

In step 640, the customer premises device maintains the lasers, used for upstream data communication, in a powered off state. Operation proceeds from step 640 to the input of step 638 for another check at a later point in time.

Returning to step 642, in step 642 the customer premises device determines that said amount of time the customer premises device should maintain its lasers, used for upstream data communication, in the powered off state has been reached. Operation proceeds from step 642 to step 644.

In step 644 the customer premises device powers up a first laser, e.g., a primary laser, used for upstream communication, in response to determining that the amount of time has been reached. Operation proceeds from step 644 to step 646.

In step 646 the customer premises device sends a message to the OLT indicating that the customer premises device is active, e.g., can transmit and receive data via the optical interface including the first laser. Operation proceeds from step 646 to step 648.

By having had the ONU inform the OLT that is was going into power save mode, e.g., due to loss of line power relying on battery back power, the ONU informs the OLT that despite the laser temporally being powered off and a temporary interruption of communication with the OLT, the OLT should continue to consider the ONU a valid registered device. In this way the OLT is made aware that is should allow the ONU to remain registered with the OLT and skip the normal registration process that would normally be required when an ONU is powered on and begins communicating with the OLT. This allows for what can be considered a fast registration process with ONU simply singling that it is once again active and powered on without requiring the ONU to proceed with a complete new registration process after powering up its laser. This is important so a 911 call can be made with little or no delay from the customer premise where the ONU switched to power save mode operation.

In step 648 the customer premises device exchanges at least some data with the OLT, e.g., during a power on time interval. In various embodiments, step 648 includes one or more or all of steps 650, 652 and 654. Steps 650 and 652 may be performed multiple times. In step 650 the customer premises device transmits data to the OLT using the first laser. In step 652 the customer premises device receives data from the OLT using a first optical receiver. In step 654 the customer premises device determines that the end of the power on time interval has been reached. Operation proceeds from step 654 or step 648 to step 634 (another iteration), in which the customer premises device places the lasers used for upstream communications in the powered off state. At this point, the countdown timer or equivalent mechanism for determining off time is re-initialized and countdown restarted.

Returning to step 612, step 612 includes step 618 in which the customer premises device detects a command to implement a normal mode of operation and step 620 in which the customer premises device detects restoration of main power availability. Operation proceeds from step 618 or step 620 to step 623. In step 623 the customer premises device powers the lasers in the first set of lasers, used for upstream communications, in response to detecting a change in main power availability indicating that main power is available or a command to implement the normal mode of operation.

Figure 7A:
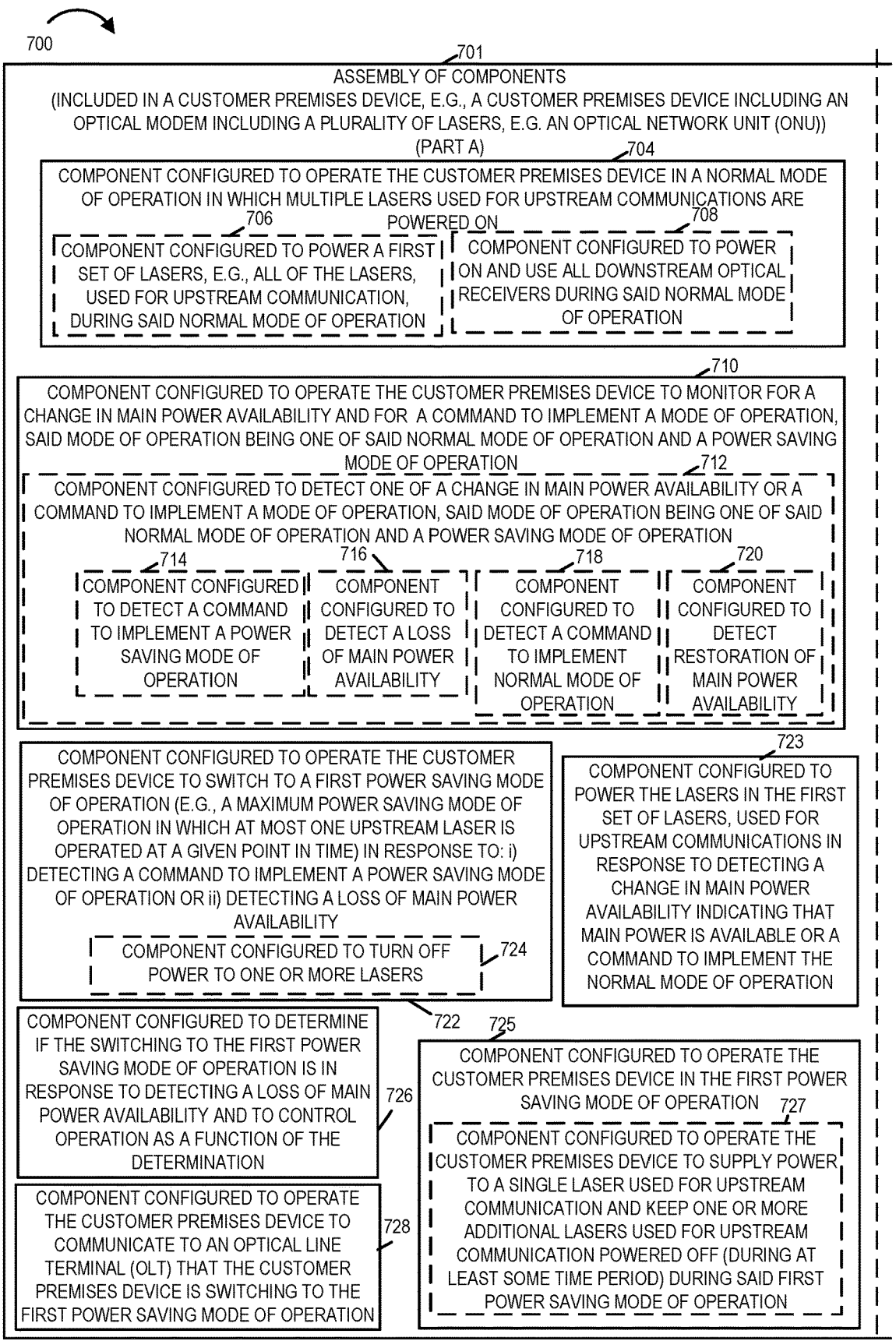
FIG. 7A is a drawing of a first part of an exemplary assembly of components which may be included in a customer premises device, e.g., a device including an optical modem including a plurality of upstream lasers, in accordance with an exemplary embodiment.
Figures 7, 7B:
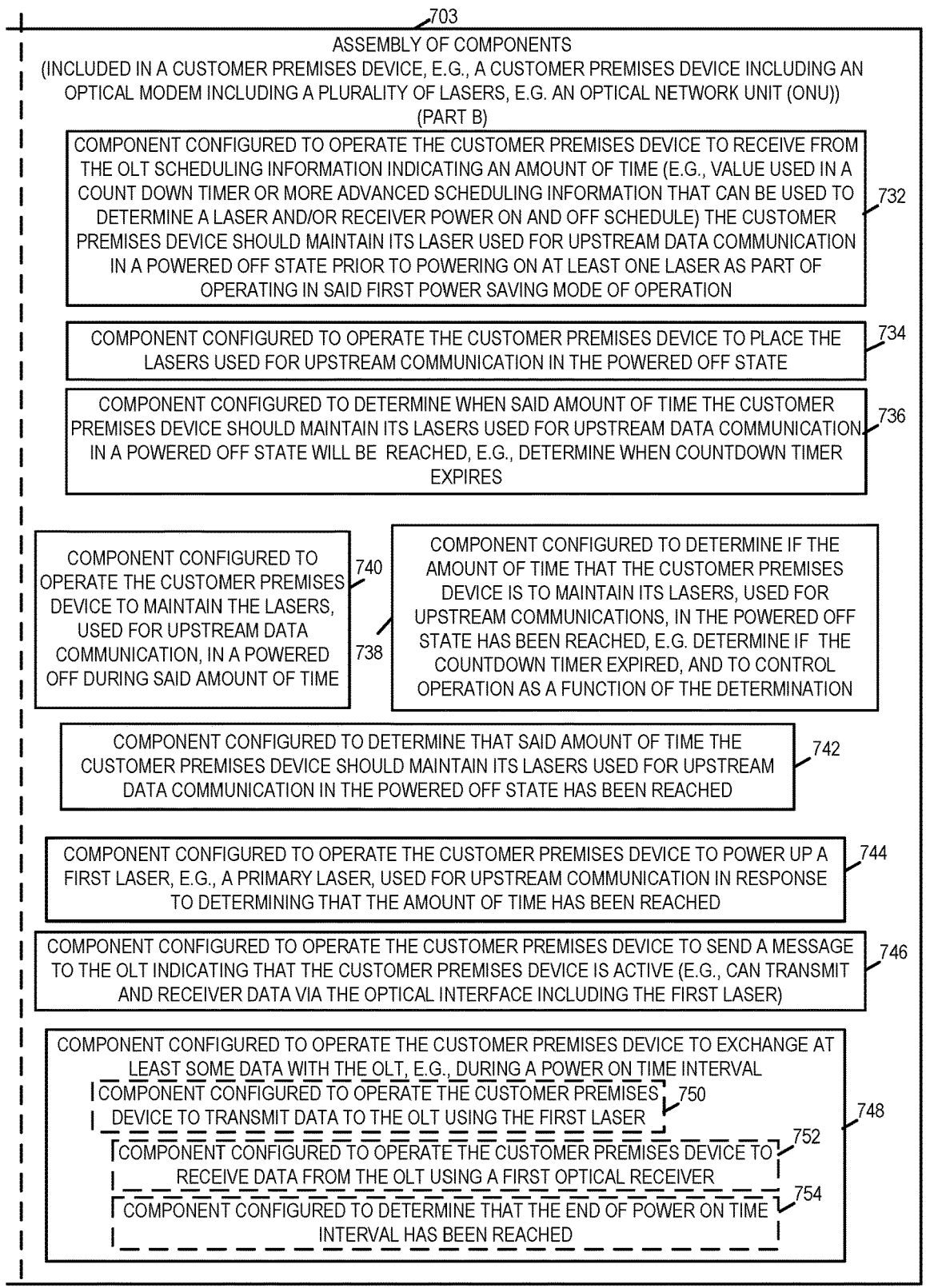
FIG. 7B is a drawing of a second part of an exemplary assembly of components which may be included in a customer premises device, e.g., a device including an optical modem including a plurality of upstream lasers, in accordance with an exemplary embodiment.
FIG. 7 comprises the combination of FIG. 7A and FIG. 7B.

FIG. 7, comprising the combination of FIG. 7A and FIG. 7B, is a drawing of an exemplary assembly of components 700, comprising Part A 701 and Part B 703, which may be included in a customer premises (CP) device, e.g., a CP device including an optical modem including a plurality of lasers, e.g., an optical network unit (ONU), in accordance with an exemplary embodiment. Exemplary assembly of components 700 is, e.g. included in customer premises device 200 of FIG. 2, e.g., a ONU, in any of the customer premises devices (ONU 1 104, ONU 2 106, . . . ONU M 108) of FIG. 1, and/or in an customer premises device, e.g., customer premises device including an optical modem (such as an ONU) including a plurality of lasers for upstream communications, implementing the method of flowchart 600 of FIG. 6, implemented in accordance with an exemplary embodiment.

The components in the assembly of components 700 can, and in some embodiments are, implemented fully in hardware within a processor, e.g., processor 202, e.g., as individual circuits. The components in the assembly of components 700 can, and in some embodiments are, implemented fully in hardware within the assembly of hardware components 214, e.g., as individual circuits corresponding to the different components. In other embodiments some of the components are implemented, e.g., as circuits, within processor 202 with other components being implemented, e.g., as circuits within assembly of components 214, external to and coupled to the processor 202. As should be appreciated the level of integration of components on the processor and/or with some components being external to the processor may be one of design choice. Alternatively, rather than being implemented as circuits, all or some of the components may be implemented in software and stored in the memory 216 of the customer premises device 200, with the components controlling operation of customer premises device 200 to implement the functions corresponding to the components when the components are executed by a processor e.g., processor 202. In some such embodiments, the assembly of components 700 is included in the memory 216 as part of assembly of software components 258. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 202, configure the processor to implement the function corresponding to the component. In embodiments where the assembly of components 700 is stored in the memory 216, the memory 215 is a computer program product comprising a computer readable medium comprising code, e.g., individual code for each component, for causing at least one computer, e.g., processor 202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the customer premises device 200 or elements therein such as the processor 202, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a component 704 configured to operate the customer premises device in a normal mode of operation in which multiple lasers used for upstream communications are powered on. In various embodiments, component 704 includes one or both of a component 706 configured to power a first set of lasers, e.g., all of the lasers, used for upstream communication, during said normal mode of operation, and a component 708 configured to power on and use all downstream optical receivers during said normal mode of operation.

Assembly of components 700 further includes a component 710 configured to operate the customer premises device to monitor for a change in main power availability and for a command to implement a mode of operation, said mode of operation being one of said normal mode of operation and a power saving mode of operation. Component 710 includes a component 712 configured to detect one of a change in main power availability or a command to implement a mode of operation, said mode of operation being said normal mode of operation and said power saving mode of operation. Component 712 includes a component 714 configured to detect a command to implement a power saving mode of operation, a component 716 configured to detect a loss of main power availability, a component 718 configured to detect a command to implement normal mode of operation, and a component 720 configured to detect restoration of main power availability.

Assembly of components 700 further includes a component 722 configured to operate the customer premises device to switch to a first power saving mode of operation (e.g., a maximum power saving mode of operation in which at most one upstream laser is operated at a given point in time) in response to: i) detecting a command to implement a power saving mode of operation or ii) detecting a loss of main power availability, e.g., in response to component 714 detecting a command to implement a power saving mode of operation or component 716 detecting a loss of main power availability. Component 722 includes a component 724 configured to turn off power to one or more lasers.

Assembly of components 700 further includes a component 723 configured to power the lasers in the first set of laser, used for upstream communications, in response to detecting, e.g., by component 720, a change in main power availability indicating that main power is available or in response to detecting, e.g. by component 718, a command to implement the normal mode of operation.

Assembly of components 700 further includes a component 725 configured to operate the customer premises device in the first power saving mode of operation, e.g. after switching from normal mode to first power saving mode. Component 725 includes a component 727 configured to operate the customer premises device to supply power to a single laser used for upstream communication and keep one or more additional lasers used for upstream communications powered off (during at least some time period) during said first power saving mode of operation. In some exemplary embodiments during the first power saving mode of operation one upstream laser is powered on during a fraction, e.g. ½, ⅓, or ¼, of the time in which the customer premises device is in the power saving mode of operation, and 3 additional upstream lasers are powered off during the full time in which the customer premises device is in the power saving mode of operation. In some exemplary embodiments during the first power saving mode of operation one upstream laser and one corresponding optical receiver are powered on during a fraction, e.g. ½, ⅓, or ¼, of the time in which the customer premises device is in the power saving mode of operation, and 3 additional upstream lasers with 3 additional corresponding optical receivers are powered off during the full time in which the customer premises device is in the power saving mode of operation.

Assembly of components 700 further includes a component 726 configured to determine if the switching to the first power saving mode of operation is in response to detecting a loss of main power availability and to control operation as a function of the determination, and a component 728 configured to operate the customer premises device to communicate to an optical lien terminal (OLT) that the customer premises device is switching to the first power saving mode of operation, e.g. in response to detecting a loss of main power availability.

Assembly of components 700 further includes a component 732 configured to operate the customer premises device to receive from the OLT scheduling information indicating an amount of time (e.g., a value to be used in count down timer or more advanced scheduling information, that can be used to determine a laser and/or optical receiver (OR) power on and off schedule) the customer premises device should maintain its laser used for upstream data communication in a powered off state prior to powering on at least one laser as part of operating in said first power saving mode of operation, a component 734 configured to operate the customer premises device to place the lasers used for upstream communication in the powered off state, a component 736 configured to determine when said amount of time the customer premises device should maintain its lasers used for upstream data communications in a powered off state will be reached, e.g., determine when the count down timer will expire, a component 738 configured to determine if the amount of time that the customer premises device is to maintain its lasers, used for upstream communication, in the powered off state has been reached, e.g. determine if the countdown timer expired, and to control operation as a function of the determination, a component 740 configured to operate the customer premises device maintain the lasers, used for upstream data communication, in a powered off time during said amount of time, e.g. in response to a determination that the count down timer has not yet expired, a component 742 configured to determine that the amount of time the customer premises device should maintain its lasers used for upstream communications in the powered off state has been reached, and a component 744 configured to operate the customer premises device to power up a first laser, e.g. a primary laser, used for upstream communication in response to determining that the amount of time has been reached, e.g., the count down timer (used for OFF time) expired. Assembly of components 700 further includes a component 746 configured to operate the customer premises device to send a message to the OLT indicating that the customer premises device is active (e.g., can transmit data via a first optical transmitter including the first laser in the optical interface and can receive data via a first optical receiver in the optical interface).

Assembly of components 700 further includes a component 748 configured to operate the customer premises device to exchange at least some data with the OLT, e.g., during a power on time interval. Component 748 includes a component 750 configured to operate the customer premises device to transmit data to the OLT using the first laser, a component 752 configured to operate the customer premises device to receive data from the OLT using a first optical receiver, and a component 754 configured to determine that the end of a power on time interval has been reached.

Figure 8A:
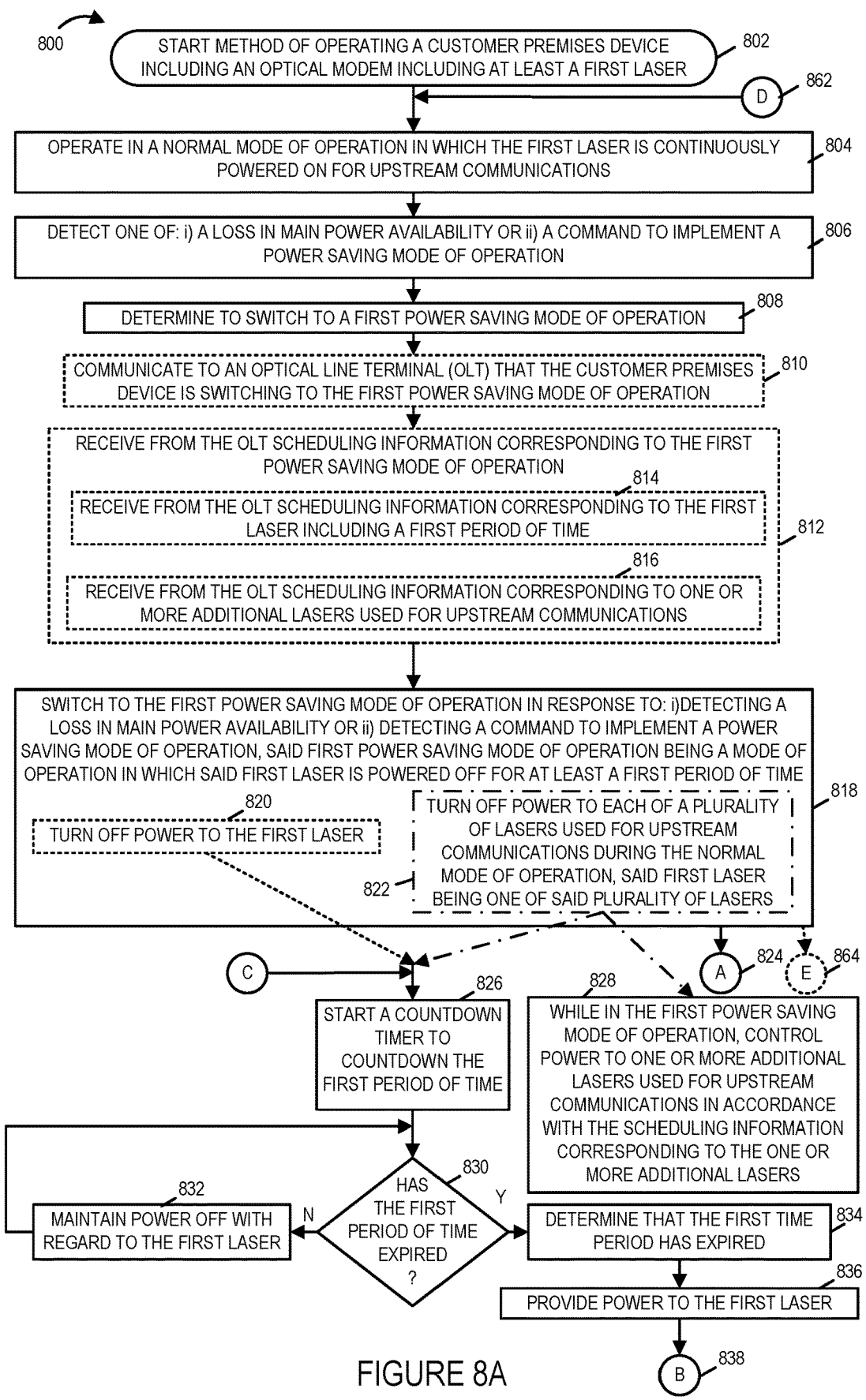
FIG. 8A is a first part of a flowchart of an exemplary method of operating a customer premises device including an optical modem including at least a first laser used for upstream communications in accordance with an exemplary embodiment.
Figure 8B:
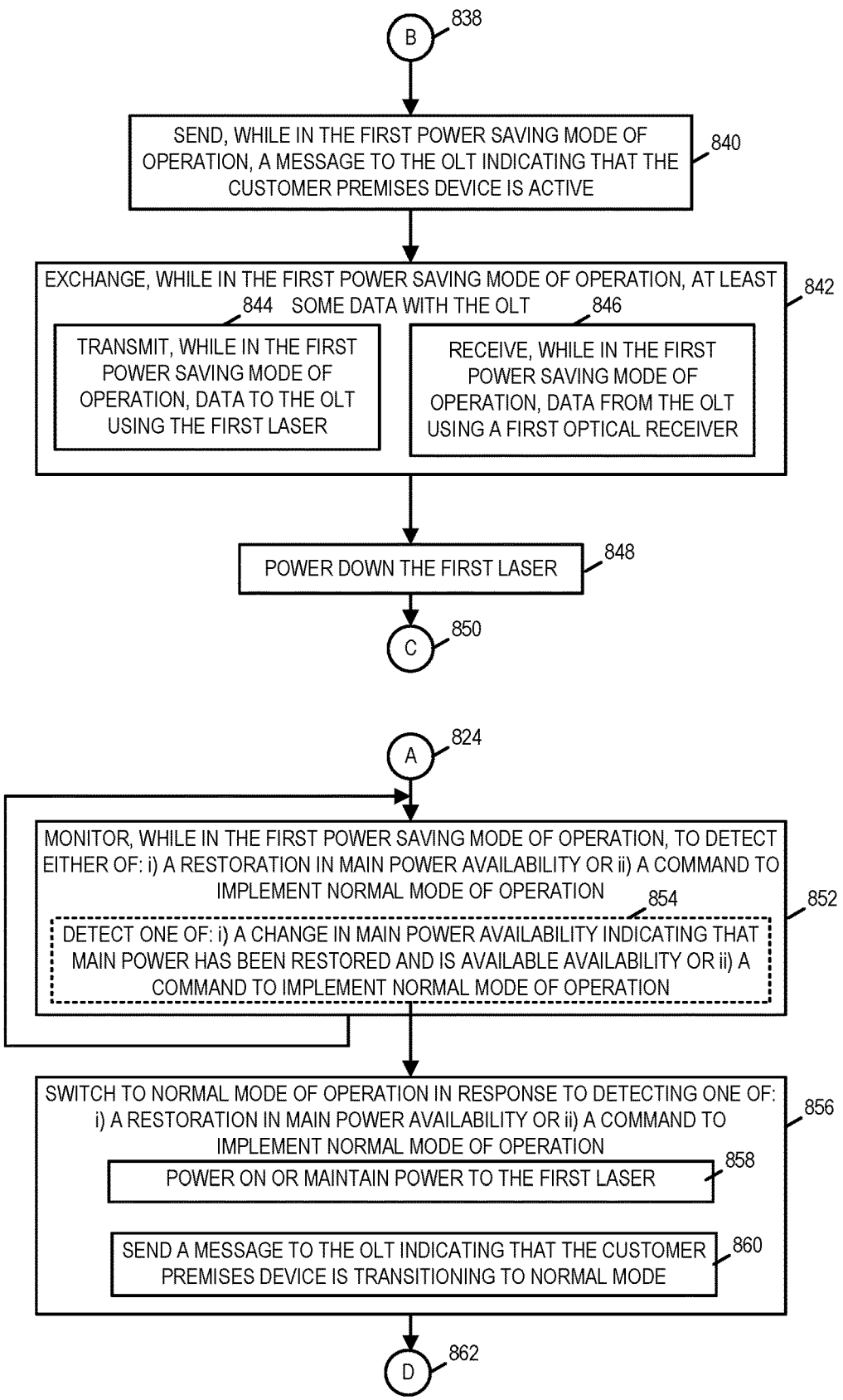
FIG. 8B is a second part of a flowchart of an exemplary method of operating a customer premises device including an optical modem including at least a first laser used for upstream communications in accordance with an exemplary embodiment.
Figures 8, 8A, 8B, 8C:
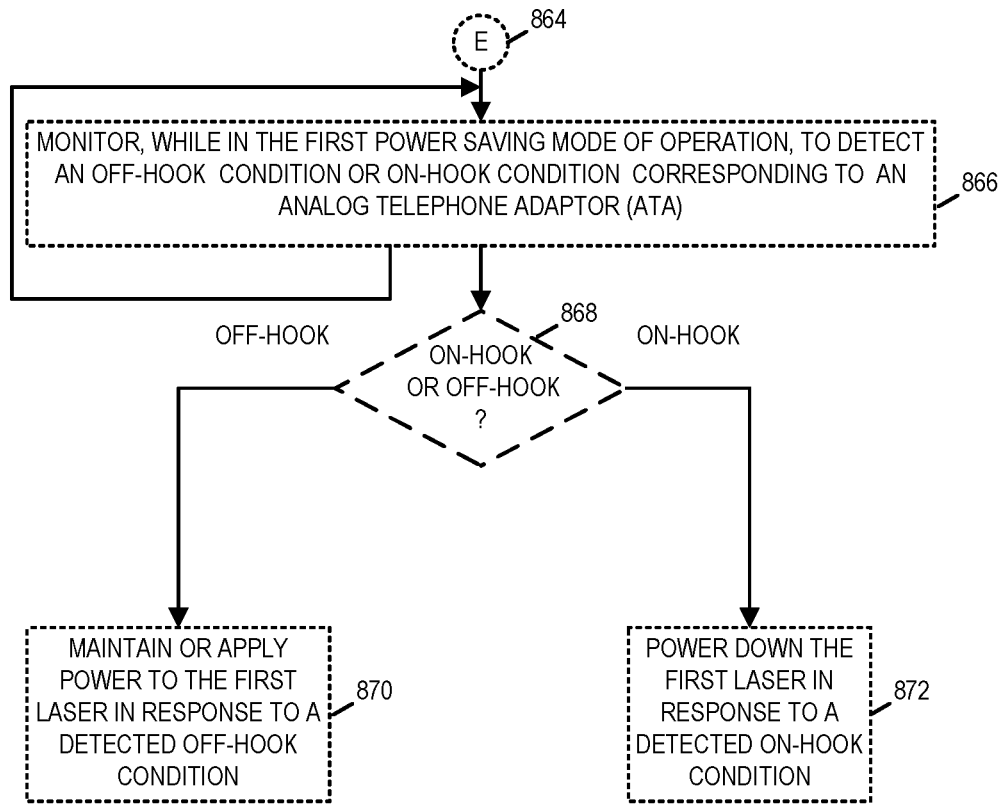
FIG. 8C is a third part of a flowchart of an exemplary method of operating a customer premises device including an optical modem including at least a first laser used for upstream communications in accordance with an exemplary embodiment.
FIG. 8, comprising the combination of FIG. 8A, FIG. 8B and FIG. 8C.

FIG. 8, comprising the combination of FIG. 8A, FIG. 8B and FIG. 8C, is a flowchart 800, of an exemplary method of operating a customer premises device including an optical modem including at least a first laser used for upstream communications. In some embodiments, the modem includes a single laser, e.g., the first laser, for upstream communications. In some embodiments, the modem includes a plurality of lasers used for upstream communication, said plurality of lasers including the first laser. In some embodiments the customer premises device implementing the flowchart 800 is an optical network unit (ONU), e.g., one of ONUs (104, 106, . . . , 108) of FIG. 1 or ONU 200 of FIG. 2 or a customer premises device including an ONU including at least one laser used for upstream communications, said customer premises device implemented in accordance with an exemplary embodiment.

Operation starts in step 802 in which the customer premises device is powered on and initialized. Operation proceeds from start step 802 to step 804. In step 804 the customer premises device operates in a normal mode of operation in which the first laser is continuously powered on for upstream communications. Operation proceeds from step 804 to step 806.

In step 806 the customer premises device detects one of: i) a loss in main power availability or ii) a command to implement a power saving mode of operation, e.g. a first power saving mode of operation. Operation proceeds from step 806 to step 808.

In step 808 the customer premises devices determines to switch to a first power saving mode of operation. Operation proceeds from step 808 to one of: optional step 810, optional step 812 or step 818. In optional step 810, the customer premises device communicates to an optical line terminal (OLT) that the customer premises device is switching to the first power saving mode of operation. Operation proceeds from step 810 to optional step 812 or to step 818.

In step 812, the customer premises device receives from the OLT scheduling information corresponding to the first power saving mode of operation. Step 812 includes step 814 and, in some embodiments including multiple upstream lasers, step 816. In step 814 the customer premises device receives from the OLT scheduling information corresponding to the first laser including information indicating a first period of time. In step 816 the customer premises device receives from the OLT scheduling information corresponding to more or more additional lasers used for upstream communications, e.g. information indicating when each of the additional lasers used for upstream communications is to be powered off. Operation proceeds from step 812 to step 818.

In step 818 the customer premises device switches to the first power saving mode of operation in response to: i) detecting a loss in main power availability or ii) detecting a command to implement a power saving mode of operation, said first power saving mode of operation being a mode of operation in which said first laser is powered off for at least a first period of time. In some embodiments, step 818 includes step 820 or step 822. In step 820 the customer premises device turns off power to the first laser. In step 822 the customer premises device turns off power to each of a plurality of lasers used for upstream communications during the normal mode of operation, said first laser being one of said plurality of lasers.

Operation proceeds from step 820 to step 826. Operation proceeds from step 822 to steps 826 and 828. Operation also proceeds from step 818, via connecting node A 824, to step 852. In some embodiments, operation proceeds from step 818, via connecting node E 865 to step 866.

Returning to step 826, in step 826 the customer premises device starts a countdown timer to countdown the first period of time. In some embodiments, the first period of time is a period of time determined by a schedule including a first laser inactivity time period. In some embodiments, the first period of time is a period of time specified by an optical line terminal (OLT). Operation proceeds from step 826 to step 830. In step 830 the customer premises device checks at to whether or not the first period of time has expired.

If the determination of step 830 is that the first period of time has not yet expired, then operation proceeds from step 830 to step 832. In step 832 the customer premises devices maintains power off with regard to the first laser. Operation proceeds from step 832 to the input of step 830 for another check at a later point time as to whether the first time period has expired.

However, if the check of step 830 determines that the first period of time has expired, then operation proceeds from step 830 to step 834 in which the customer premises device determines that the first period of time has expired. Operation proceeds from step 834 to step 836. In step 836 the customer premises device provides power to the first laser, e.g. in response to the determination that the first period of time has expired. Operation proceeds from step 836, via connecting node B 838, to step 840. In step 840 the customer premises device sends, while in the first power saving mode of operation, a message to the OLT indicating that the customer premises device is active. Operation proceeds from step 840 to step 842.

In step 842 the customer premises device exchanges, while in the first power saving mode of operation, at least some data with the OLT. Step 842 includes steps 844 and 846. In step 844 the customer premises device transmits, while in the first power saving mode of operation, data to the OLT using the first laser. In step 846 the customer premises device receives, while in the first power saving mode of operation, data from the OLT using a first optical receiver. Operation proceeds from step 842 to step 848. In step 848 the customer premises device powers down the first laser. Operation proceeds from step 848, via connecting node C 850 to the input of step 826.

Returning to step 852, in step 852 the customer premises device monitors, while in the first power saving mode of operation, to detect either of: i) a restoration in main power availability or ii) a command to implement a normal mode of operation. Step 852, may and sometimes does include step 854 in which the customer premises device detects one of: i) a change in main power availability indicating that main power has been restored and is available or ii) a command to implement normal mode of operation. Operation proceeds from step 854 to step 856. In step 856 the customer premises device switches to normal mode of operation in response to detecting one of: i) a restoration in main power availability or ii) a command to implement normal mode of operation. Step 856 includes steps 858 and 860. In step 858 the customer premises device powers on or maintains power to the first laser. In step 860 the customer premises device sends a message to the OLT indicating that the customer premises device is transitioning to the normal mode of operation. Operation proceeds from step 856, via connecting node D 862 to step 804, in which the customer premises device is again operated in the normal mode of operation.

Returning to step 866, in step 866 the customer premises device monitors, while in the first power saving mode of operation, to detect an off-hook condition or on-hook condition corresponding to an analog telephone adaptor (ATA), e.g., an ATA included in (embedded in) or coupled to the customer premises device. Step 866 may be performed on an ongoing basis, e.g. repetitively, while in the first power saving mode of operation. Operation proceeds from step 866 to step 868. If step 868 determines that the condition is off-hook, then operation proceeds from step 868 to step 870, in which the customer premises device maintain power to or applies power to the first laser in response to a detected off-hook condition. If step 868 determines that the condition is on-hook, then operation proceeds from step 868 to step 872, in which the customer premises device powers down the first laser or maintains the first laser in a power off state in response to a detected on-hook condition. In some embodiments, in which step 866 is performed, a detected off-hook condition (while in the first power saving mode of operation) results in step 870 being performed and overrides any first laser off control in accordance with a schedule, e.g. overrides the first period of time.

Figure 9A:
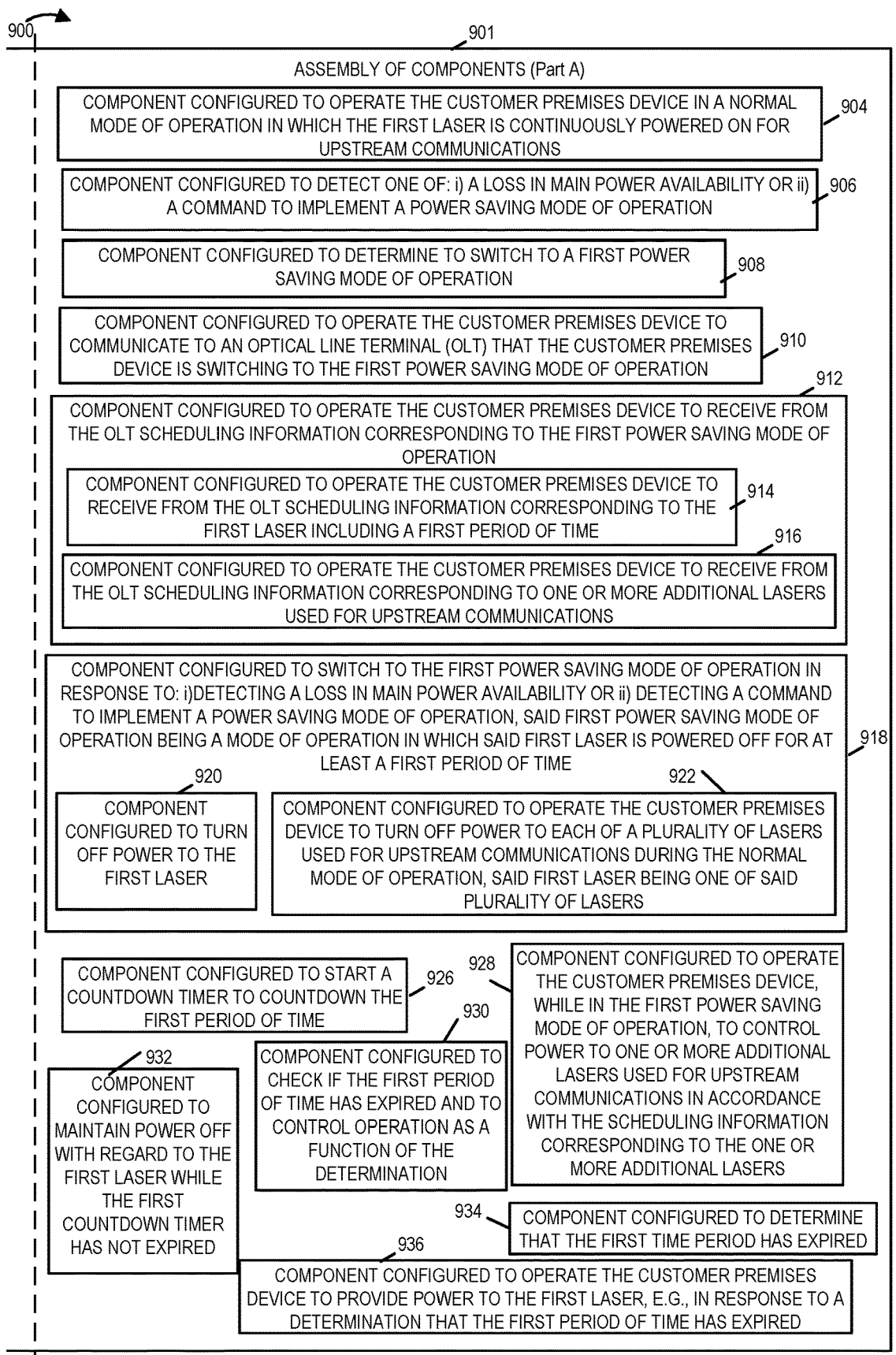
FIG. 9A is a drawing of a first part of an exemplary assembly of components which may be included in a customer premises device, e.g., a device including an optical modem including at least one of upstream laser, in accordance with an exemplary embodiment.
Figures 9, 9B:
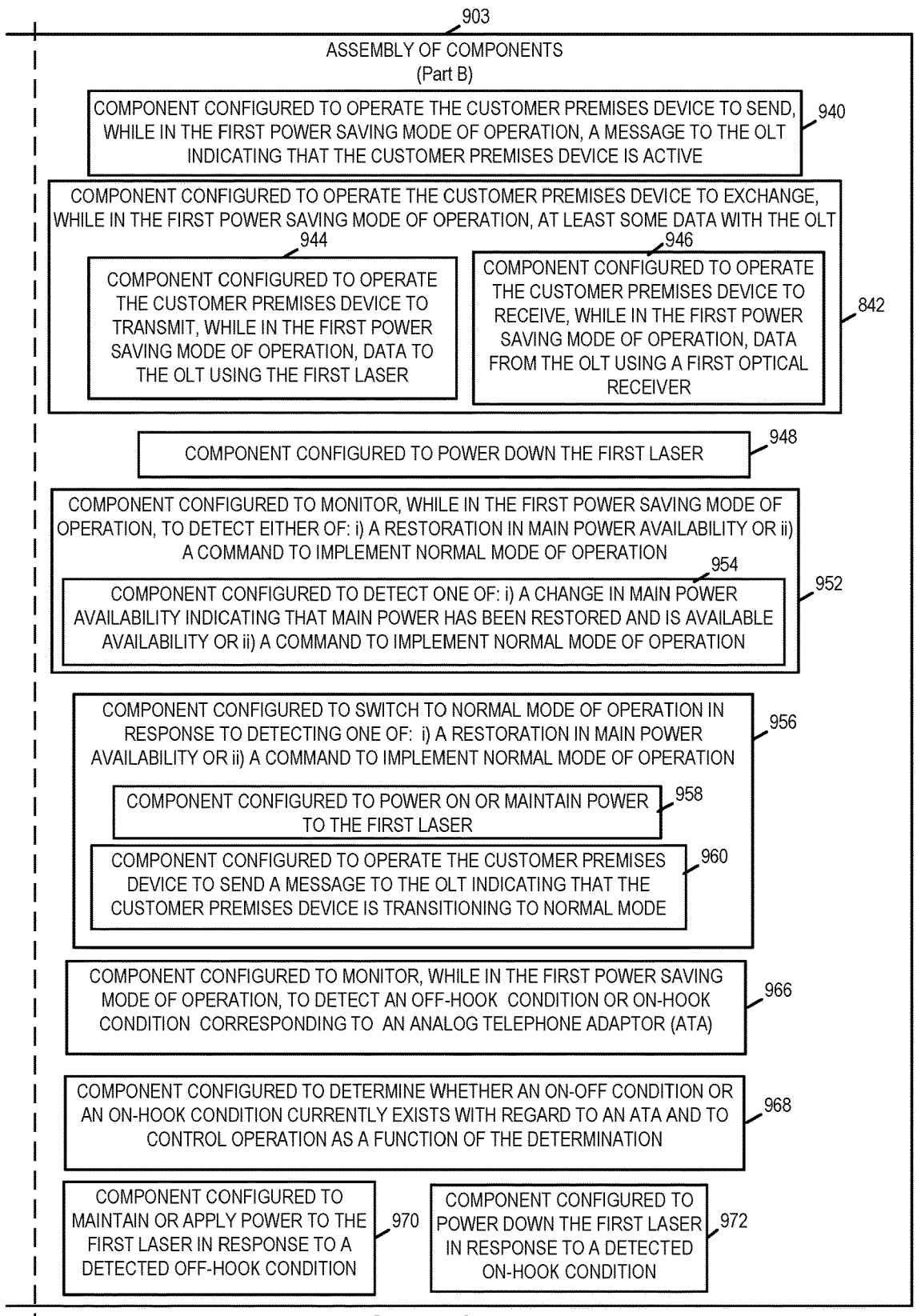
FIG. 9B is a drawing of a second part of an exemplary assembly of components which may be included in a customer premises device, e.g., a device including an optical modem including at least one upstream laser, in accordance with an exemplary embodiment.
FIG. 9 comprises the combination of FIG. 9A and FIG. 9B.

FIG. 9, comprising the combination of FIG. 9A and FIG. 9B, is a drawing of an exemplary assembly of components 900, comprising Part A 901 and Part B 903, which may be included in a customer premises (CP) device, e.g., a CP device including an optical modem including at least one laser, e.g., an optical network unit (ONU), in accordance with an exemplary embodiment. Exemplary assembly of components 900 is, e.g. included in customer premises device 200 of FIG. 2, e.g., a ONU, in any of the customer premises devices (ONU 1 104, ONU 2 106, . . . ONU M 108) of FIG. 1, and/or in an customer premises device, e.g., customer premises device including an optical modem (such as an ONU) including at least one laser for upstream communications, implementing the method of flowchart 800 of FIG. 8, implemented in accordance with an exemplary embodiment.

The components in the assembly of components 900 can, and in some embodiments are, implemented fully in hardware within a processor, e.g., processor 202, e.g., as individual circuits. The components in the assembly of components 900 can, and in some embodiments are, implemented fully in hardware within the assembly of hardware components 214, e.g., as individual circuits corresponding to the different components. In other embodiments some of the components are implemented, e.g., as circuits, within processor 202 with other components being implemented, e.g., as circuits within assembly of components 214, external to and coupled to the processor 202. As should be appreciated the level of integration of components on the processor and/or with some components being external to the processor may be one of design choice. Alternatively, rather than being implemented as circuits, all or some of the components may be implemented in software and stored in the memory 216 of the customer premises device 200, with the components controlling operation of customer premises device 200 to implement the functions corresponding to the components when the components are executed by a processor e.g., processor 202. In some such embodiments, the assembly of components 900 is included in the memory 216 as part of assembly of software components 258. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 202, configure the processor to implement the function corresponding to the component. In embodiments where the assembly of components 900 is stored in the memory 216, the memory 215 is a computer program product comprising a computer readable medium comprising code, e.g., individual code for each component, for causing at least one computer, e.g., processor 202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the customer premises device 200 or elements therein such as the processor 202, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., the method of flowchart 800 of FIG. 8.

Assembly of components 900 includes a component 904 configured to operate the customer premises device in a normal mode of operation in which the first laser is continuously powered on for upstream communications, a component 906 configured to detect one of: i) loss in main power availability, or ii) a command to implement a power savings mode of operation, a component 908 configured to determine to switch to a first power saving mode of operation, a component 910 configured to operate the customer premises device to communicate to an optical line terminal (OLT) that the customer premises device is switching to the first power saving mode of operation, and a component 910 configured to operate the customer premises device to receive from the OLT scheduling information corresponding to the first power saving mode of operation. Component 910 includes a component configured to operate the customer premises device to receive from the OLT scheduling information corresponding to the first laser including a first period of time and a component 916 configured to operate the customer premises device to receive from the OLT scheduling information corresponding to one or more additional lased used for upstream communications.

Assembly of components 900 further includes a component 918 configured to switch to the first power saving mode of operation in response to: i) detecting a loss in main power availability or ii) detecting a command to implement a power saving mode of operation, said first power saving mode of operation being a mode of operation in which the first laser is powered off for at least a first period of time. Component 918 includes a component 920 configured to turn off power to the first laser, and a component 922 configured to operate the customer premises device to turn off power to each of a plurality of lasers, used for upstream communications during the normal mode of operation, said first laser being one of said plurality of lasers.

Assembly of components 900 further includes a component 926 configured to start a countdown timer to countdown the first time period, a component configured to check if the first period of time has expired and to control operation as a function of the determination, a component 932 configured to maintain power off with regard to the first laser while the first countdown timer has not expired, a component 934 configured to determine that the first time period has expired, and a component 936 configured to operate the customer premises device to provide power to the first laser, e.g. in response to a determination that the first time period has expired.

Assembly of components 900 further includes a component 928 configured to operate the customer premises device, while in the first power saving mode of operation to control power to one or more additional lasers used for upstream communications in accordance with the scheduling information corresponding to the one or more additional lasers.

Assembly of components 900 further includes a component 940 configured to operate the customer premises device to send, while in the firsts power saving mode of operation, a message to the OLT indicating that the customer premises device is active, a component 942 configured to operate the customer premises device to exchange, while in the first power saving mode of operation, at least some data with the OLT. Component 942 includes a component 944 configured to operate the customer premises device to transmit, while in the first power saving mode of operation, data to the OLT using the first laser and a component 946 configured to operate the customer premises device to receive, while in the first power saving mode of operation, data from the OLT using a first optical receiver.

Assembly of components 900 further includes a component 952 configured to monitor, while in the first power saving mode of operation, to detect either of: i) a restoration in main power availability, or ii) a command to implement normal mode of operation. Component 952 includes a component 954 configured to detect one of: i) a change in main power availability indicating that main power has been restored and is available, or ii) a command to implement a normal mode of operation.

Assembly of components 900 further includes a component 956 configured to switch to normal mode of operation in response to detecting one of: i) a restoration in main power availability or ii) a command to implement normal mode of operation. Component 956 includes a component 958 configured to power on or maintain power to the first laser, and a component 960 configured to operate the customer premises device to send a message to the OLT indicating that the customer premises device is transitioning to the normal mode. In some embodiments, including a plurality of lasers used for upstream communications in the normal mode of operation, component 958 is configured to power one the full set of lasers used for upstream communications.

Assembly of components 900 further includes a component 966 configured to monitor, while in the first power saving mode of operation, to detect an off-hook condition or an on-hook condition with regard to an analog telephone adaptor (ATA), e.g. an ATA included in the customer premises device or an coupled to the customer premises device, a component configured to determine whether an off-hook condition or an on-hook condition currently exists with regard to the an ATA and to control operation as a function of the determination, a component 970 configured to maintain or apply power to the first laser in response to a detected off-hook condition, e.g., while in the first power saving mode of operation, and a component 972 configured to power down the first laser in response to an on-hook condition, e.g. while in the first power saving mode of operation.

The numbering used within a particular list of numbered embodiments pertains to that particular list.

First Numbered List of Exemplary Method Embodiments

Method Embodiment 1 A method of operating a customer premises device including an optical modem including a plurality of lasers, the method comprising: operating (604) in a normal mode of operation in which multiple lasers used for upstream communication are powered on; detecting (610) one of a change in main power availability or a command to implement a mode of operation, said mode of operation being one of said normal mode of operation and a power saving mode of operation; and switching (622) to a first power saving mode of operation in response to: i) detecting (614) a command to implement a power saving mode of operation or ii) detecting (616) a loss of main power availability.

Method Embodiment 2 The method of Method Embodiment 1, wherein operating (604) in the normal mode of operation includes powering (606) a first set of lasers and wherein switching (622) to the first power saving mode of operation includes: turning (624) off power to one or more lasers.

Method Embodiment 3 The method of Method Embodiment 2, wherein all lasers which are used for upstream communication are powered on (706) during said normal mode of operation.

Method Embodiment 4 The method of Method Embodiment 3, wherein all downstream optical receivers are powered and used (608) during said normal mode of operation.

Method Embodiment 5 The method of Method Embodiment 2, wherein operating in the normal mode of operation includes powering (606) a first set of lasers used for upstream communication, the method further comprising: operating (625) in said first power saving mode of operation after switching (622) to the first power saving mode of operation, wherein operating (625) in the first power saving mode of operation including (627) supplying power to a single laser used for upstream communication and keeping one or more additional lasers used for upstream communication powered off during (at least some time period during) said first power saving mode of operation.

Method Embodiment 6 The method of Method Embodiment 1, wherein said first power saving mode of operation is a maximum power saving mode of operation in which at most one upstream laser is operated at any given point in time.

Method Embodiment 7 The method of Method Embodiment 5, wherein said switching (622) to a first power saving mode of operation is in response to detecting a loss of main power availability (616), the method further comprising: communicating (628) to an optical line terminal (OLT) that the customer premises device is switching to the first power saving mode of operation.

Method Embodiment 8 The method of Method Embodiment 7, further comprising: receiving (632) from the OLT scheduling information indicating an amount of time (e.g., value used in a count down time or more advanced scheduling information that can be used to determine a laser and/or receiver power on and off schedule) the customer premises device should maintain its lasers used for upstream data communication in a powered off state prior to powering on at least one laser as part of operating in said first power saving mode of operation; placing (634) the lasers used for upstream communication in the powered off; and maintaining (640) the lasers used for upstream communication in the powered off state for said amount of time.

Method Embodiment 9 The method of Method Embodiment 8, further comprising: determining (636) when said amount of time the customer premises device should maintain its lasers used for upstream data communication in a powered off state will be reached; and powering (644) up a first laser (e.g., a primary laser) used for upstream communication in response to determining (642) that the amount of time has been reached.

Method Embodiment 10 The method of Method Embodiment 9, further comprising: sending (646) a message to the OLT indicating that the customer premises device is active (e.g., and can transmit and receive data via the optical interface including the first laser).

Method Embodiment 11 The method of Method Embodiment 10, further comprising: transmitting (650) data to the OLT using the first laser; and receiving (652) data from the OLT using a first optical receiver.

Method Embodiment 12 The method of Method Embodiment 10, further comprising: exchanging (648) at least some data with the OLT; and placing (634 repeat iteration) the lasers used for upstream communication in the powered off state; and maintaining (640 repeat iteration) the lasers used for upstream communication in the powered off state for said amount of time.

Method Embodiment 13 The method of Method Embodiment 12, further comprising: detecting (618 or 620) a change in main power availability indicating that main power is available or a command to implement the normal mode of operation; and powering (623) the lasers in the first group of lasers used for upstream communication in response to detecting a change in main power availability indicating that main power is available or a command to implement the normal mode of operation.

Second Numbered List of Exemplary Method Embodiments

Method Embodiment 1 A method of operating a customer premises device including an optical modem including at least a first laser, the method comprising: operating (804) in a normal mode of operation in which the first laser is continuously powered on for upstream communications; detecting (806) one of: i) a loss in main power availability or ii) a command to implement a power saving mode of operation; and switching (818) to a first power saving mode of operation in response to: i) detecting a command to implement a power saving mode of operation or ii) detecting a loss of main power availability, said first power saving mode of operation being a mode of operation in which said first laser is powered off for at least a first period of time.

Method Embodiment 2 The method of Method Embodiment 1, wherein switching (820) to the first power saving mode of operation includes: turning (820) off power to the first laser.

Method Embodiment 3 The method of Method Embodiment 2, further comprising: maintaining (832) first laser used for upstream communication in the powered off state for first period of time.

Method Embodiment 4 The method of Method Embodiment 3, further comprising: determining (834) (e.g., using a countdown timer) expiration of said first period of time; and providing (836) power to the first laser at the end of said first period of time.

Method Embodiment 5 The method of Method Embodiment 4, wherein said first period of time is a period of time determined by a schedule including a first laser inactivity time period.

Method Embodiment 6 The method of Method Embodiment 4, wherein said first period of time is a period of time specified by an optical line terminal (OLT).

Method Embodiment 7 The method of Method Embodiment 4, wherein said customer premises device (including the optical modem) includes a plurality of lasers used for upstream communication and wherein said first laser is one of said plurality of lasers used for upstream communication.

Method Embodiment 8 The method of Method Embodiment 7, wherein said plurality of lasers used for upstream communication are powered on during said normal mode of operation; and wherein switching (816) to a first power saving mode of operation includes turning off (822) power to each of said plurality of lasers used for upstream communication.

Method Embodiment 9 The method of Method Embodiment 7, wherein said customer premises device (including the optical modem) includes a plurality of downstream optical receivers; and wherein said plurality of downstream optical receivers are powered and used during said normal mode of operation.

Method Embodiment 10 The method of Method Embodiment 3, wherein said switching (816) to a first power saving mode of operation is in response to detecting a loss of main power availability, the method further comprising: communicating (810) to an optical line terminal (OLT) that the customer premises device is switching to the first power saving mode of operation.

Method Embodiment 11 The method of Method Embodiment 4, further comprising: receiving (814) from the OLT scheduling information indicating said first period of time.

Method Embodiment 12 The method of Method Embodiment 4, further comprising: sending (840), while in the first power saving mode of operation, a message to the OLT indicating that the customer premises device is active (e.g., and can transmit and receive data via the first laser).

Method Embodiment 13 The method of Method Embodiment 12, further comprising: transmitting (844), while in the first power saving mode of operation, data to the OLT using the first laser; and receiving (846), while in the first power saving mode of operation, data from the OLT using a first optical receiver.

Method Embodiment 14 The method of Method Embodiment 12, further comprising: exchanging (842), while in the power saving mode of operation, at least some data with the OLT; and placing (848) the first laser in the powered off Method Embodiment 15 The method of Method Embodiment 2, further comprising: detecting (854) one of: i) a change in main power availability indicating that main power has been restored and is available or ii) a command to implement the normal mode of operation; and switching (856) to normal mode of operation in response to: detecting (854) one of: i) a change in main power availability indicating that main power has been restored and is available or ii) a command to implement the normal mode of operation.

Method Embodiment 16 The method of Method Embodiment 15, wherein switching (856) to normal mode of operation includes: powering (858) on or maintaining power to the first laser; and sending (860) a message to the OLT indicating that the customer premises device is switching to normal mode.

Method Embodiment 17 The method of Method Embodiment 2, further comprising: monitoring (866), while in the first power saving mode of operation, to detect one of: an on-hook condition or an off hook condition corresponding to an analog-telephone-adaptor (ATA); in response to detecting an off-hook condition, maintain or apply power (870) to the first laser; and in response to detecting an on-hook condition, power down (872) the first laser.

First Numbered List of Exemplary Apparatus Embodiments

Apparatus Embodiment 1 A customer premises device (200 or 104 or 106 or 108) (including an optical modem including a plurality of lasers), the customer premises device (200) comprising: a plurality of lasers (219, 223, 227, 231) for upstream communication; a plurality of optical receivers (220, 224, 228, 232) for downstream communication; a power monitoring circuit (246) configured to monitor main power availability; and a processor (202) configured to: operate (604) the customer premises device (202) in a normal mode of operation in which multiple lasers (219, 223, 227, 231) used for upstream communication are powered on; detect (610) one of a change in main power availability or a command to implement a mode of operation, said mode of operation being one of said normal mode of operation and a power saving mode of operation; and switch (622) to a first power saving mode of operation in response to: i) detecting (614) a command to implement a power saving mode of operation or ii) detecting (616) a loss of main power availability.

Apparatus Embodiment 2 The customer premises device (200) of Apparatus Embodiment 1, wherein said processor (202) is configured to power (606) a first set of lasers (219, 223, 227, 231) as part of being configured to operate (604) in the normal mode of operation; and wherein said processor (202) is configured to turn (624) off power to one or more lasers (219, 223, 227, 231), as part of being configured to switching (622) to the first power saving mode of operation.

Apparatus Embodiment 3 The customer premises device (200) of Apparatus Embodiment 2, wherein all lasers (219, 223, 227, 231) which are used for upstream communication are powered on (706) during said normal mode of operation.

Apparatus Embodiment 4 The customer premises device (200) of Apparatus Embodiment 3, wherein all downstream optical receivers (220, 224, 228, 232) are powered and used (608) during said normal mode of operation.

Apparatus Embodiment 5 The customer premises device (200) of Apparatus Embodiment 2, wherein said processor (202) is configured to: power (606) a first set of lasers (219, 223, 227, 231) used for upstream communication, as part of being configured to operate in the normal mode of operation; and operate (625) in said first power saving mode of operation after switching (622) to the first power saving mode of operation, wherein operating (625) in the first power saving mode of operation including (627) supplying power to a single laser (219) used for upstream communication and keeping one or more additional lasers (223, 227, 231) used for upstream communication powered off during (at least some time period during) said first power saving mode of operation.

Apparatus Embodiment 6 The customer premises device (200) of Apparatus Embodiment 1, wherein said first power saving mode of operation is a maximum power saving mode of operation in which at most one upstream laser (219) is operated at any given point in time.

Apparatus Embodiment 7 The customer premises device (200) of Apparatus Embodiment 5, wherein said switching (622) to a first power saving mode of operation is in response to detecting a loss of main power availability (616); and wherein said processor (202) is further configured to: operate the customer premises device (200) to communicate (628) to an optical line terminal (OLT) (102) that the customer premises device (200) is switching to the first power saving mode of operation.

Apparatus Embodiment 8 The customer premises device (200) of Apparatus Embodiment 7, wherein said processor (202) is further configured to: operate the customer premises device (202) to receive (632) (e.g., via a first optical receiver (220)) from the OLT (102) scheduling information indicating an amount of time (e.g., value used in a count down time or more advanced scheduling information that can be used to determine a laser and/or receiver power on and off schedule) the customer premises device (200) should maintain its lasers (219, 223, 227, 231) used for upstream data communication in a powered off state prior to powering on at least one laser (219) as part of operating in said first power saving mode of operation; operate the customer premises device (200) to place (634) the lasers (219, 223, 227, 231) used for upstream communication in the powered off; and operate the customer premises device (200) to maintain (640) the lasers (219, 223, 227, 231) used for upstream communication in the powered off state for said amount of time.

Apparatus Embodiment 9 The customer premises (200) of Apparatus Embodiment 8, wherein said processor (202) is further configured to: determine (636) when said amount of time the customer premises device (200) should maintain its lasers (219, 223, 227, 231) used for upstream data communication in a powered off state will be reached; and operate the customer premises device (200) to power (644) up a first laser (219) (e.g., a primary laser) used for upstream communication in response to determining (642) that the amount of time has been reached.

Apparatus Embodiment 10 The customer premises device (200) of Apparatus Embodiment 9, wherein said processor (202) is further configured to: operate the customer premises device (200) to send (646) a message to the OLT (102) indicating that the customer premises device (200) is active (e.g., and can transmit and receive data via the optical interface including the first laser).

Apparatus Embodiment 11 The customer premises device (200) of Apparatus Embodiment 10, wherein said processor (202) is further configured to: operate the customer premises device (200) to transmit (650) data to the OLT (102) using the first laser (219); and operate the customer premises device (200) to receive (652) data from the OLT (102) using a first optical receiver (220).

Apparatus Embodiment 12 The customer premises device (200) of Apparatus Embodiment 10, wherein said processor (202) is further configured to: operate the customer premises device (200) to exchange (648) at least some data with the OLT (102); and operate the customer premises device (200) to place (634 repeat iteration) the lasers (219, 223, 227, 231) used for upstream communication in the powered off state; and operate the customer premises device (200) to maintain (640 repeat iteration) the lasers (219, 223, 227, 231) used for upstream communication in the powered off state for said amount of time.

Apparatus Embodiment 13 The customer premises device (200) of Apparatus Embodiment 12, wherein said processor (202) is further configured to: detect (618 or 620) a change in main power availability indicating that main power is available or a command to implement the normal mode of operation; and operate the customer premises device (202) to power (623) the lasers (219, 223, 227, 229) in the first group of lasers used for upstream communication in response to detecting a change in main power availability indicating that main power is available or a command to implement the normal mode of operation.

Second Numbered List of Exemplary Apparatus Embodiments

Apparatus Embodiment 1 A customer premises device (200 or 104 or 106 or 108) (including an optical modem including at least a first laser), the customer premises device (200) comprising: a first laser (219) for upstream communication; a first optical receiver (220) for downstream communication; a power monitoring circuit (246) configured to monitor main power availability; and a processor (202) configured to: operate (804) the customer premises device in a normal mode of operation in which the first laser is continuously powered on for upstream communications; detect (806) one of: i) a loss in main power availability or ii) a command to implement a power saving mode of operation; and switch (818) to a first power saving mode of operation in response to: i) detecting a command to implement a power saving mode of operation or ii) detecting a loss of main power availability, said first power saving mode of operation being a mode of operation in which said first laser is powered off for at least a first period of time.

Apparatus Embodiment 2 The customer premises device of Apparatus Embodiment 1, wherein said processor is configured to: turn (820) off power to the first laser, as part of being configured to switch (820) to the first power saving mode of operation.

Apparatus Embodiment 3 The customer premises device of Apparatus Embodiment 2, wherein said processor is configured to: maintain (832) first laser used for upstream communication in the powered off state for first period of time.

Apparatus Embodiment 4 The customer premises device of Apparatus Embodiment 3, wherein said processor is further configured to: determine (834) (e.g., using a countdown timer) expiration of said first period of time; and provide (836) power to the first laser at the end of said first period of time.

Apparatus Embodiment 5 The customer premises device of Apparatus Embodiment 4, wherein said first period of time is a period of time determined by a schedule including a first laser inactivity time period.

Apparatus Embodiment 6 The customer premises device of Apparatus Embodiment 4, wherein said first period of time is a period of time specified by an optical line terminal (OLT).

Apparatus Embodiment 7 The customer premises device of Apparatus Embodiment 4, further comprising: one or more additional lasers (223, 227, 231) used for upstream communications, wherein said first laser (219) and said one or more additional lasers (223, 227, 231) used for upstream communications, are a plurality of lasers (219, 223, 227, 231) used for upstream communications.

Apparatus Embodiment 8 The customer premises device of Apparatus Embodiment 7, wherein said processor is configured to: powered on said plurality of lasers used for upstream communication (219, 223, 227, 231) during said normal mode of operation; and wherein said processor is configured to turn off (822) power to each of said plurality of lasers (219, 223, 227, 231) used for upstream communication, as part of being configured to switch (816) to a first power saving mode of operation.

Apparatus Embodiment 9 The customer premises device of Apparatus Embodiment 7, further comprising: a plurality of downstream optical receivers (220, 224, 228, 232); and wherein said processor is configured to power on and use said plurality of downstream optical receivers during said normal mode of operation.

Apparatus Embodiment 10 The customer premises device of Apparatus Embodiment 3, wherein said processor is configured to: operate the customer premises device to communicate (810) to an optical line terminal (OLT) that the customer premises device is switching to the first power saving mode of operation.

Apparatus Embodiment 11 The customer premises device of Apparatus Embodiment 4, wherein said processor is further configured to: operate the customer premises device to receive (814) from the OLT scheduling information indicating said first period of time.

Apparatus Embodiment 12 The customer premises device of Apparatus Embodiment 4, wherein said processor is further configured to: operate the customer premises device to send (840), while in the first power saving mode of operation, a message to the OLT indicating that the customer premises device is active (e.g., and can transmit and receive data via the first laser).

Apparatus Embodiment 13 The customer premises device of Apparatus Embodiment 12, wherein said processor is configured to: operate the customer premises device to transmit (844), while in the first power saving mode of operation, data to the OLT using the first laser (219); and operate the customer premises device to receive (846), while in the first power saving mode of operation, data from the OLT using a first optical receiver (220).

Apparatus Embodiment 14 The customer premises device of Apparatus Embodiment 12, wherein said processor is configured to: operate the customer premises device to exchange (842), while in the power saving mode of operation, at least some data with the OLT; and placing (848) the first laser (219) in the powered off state.

Apparatus Embodiment 15 The customer premises device of Apparatus Embodiment 2, wherein said processor is further configured to: detect (854) one of: i) a change in main power availability indicating that main power has been restored and is available or ii) a command to implement the normal mode of operation; and switch (856) to normal mode of operation in response to: detecting (854) one of: i) a change in main power availability indicating that main power has been restored and is available or ii) a command to implement the normal mode of operation.

Apparatus Embodiment 16 The customer premises device of Apparatus Embodiment 15, wherein said processor is configured to: powering (858) on or maintaining power to the first laser; and operate the customer premises device to send (860) a message to the OLT indicating that the customer premises device is switching to normal mode, as part of being configured to switch (856) to normal mode of operation.

Apparatus Embodiment 17 The customer premises device of Apparatus Embodiment 2, wherein said processor is further configured to: monitor (866), while in the first power saving mode of operation, to detect one of a on-hook condition or an off hook condition corresponding to an analog-telephone-adaptor (ATA) (299); in response to detecting an off-hook condition, maintain or apply power (870) to the first laser (219); and in response to detecting an on-hook condition, power down (872) the first laser (219).

First Numbered List of Exemplary Non-Transitory Computer Readable Medium Embodiments Non-Transitory Computer Readable Medium Embodiment 1 A non-transitory computer readable medium (216) including computer executable instructions which when executed by a processor (202) of a customer premises device (200) (e.g., a device including an optical modem including a plurality of lasers (219, 223, 227, 231) cause the customer premises device (200) to perform the steps of: operating (604) in a normal mode of operation in which multiple lasers used for upstream communication are powered on; detecting (610) one of a change in main power availability or a command to implement a mode of operation, said mode of operation being one of said normal mode of operation and a power saving mode of operation; and switching (622) to a first power saving mode of operation in response to: i) detecting (614) a command to implement a power saving mode of operation or ii) detecting (616) a loss of main power availability.

Second Numbered List of Exemplary
Non-Transitory Computer Readable Medium
Embodiments Non-Transitory Computer Readable Medium Embodiment 1 A non-transitory computer readable medium (216) including computer executable instructions which when executed by a processor (202) of a customer premises device (200) (e.g., a device including an optical modem including at least one laser (219)) cause the customer premises device (200) to perform the steps of: operating (804) in a normal mode of operation in which the first laser is continuously powered on for upstream communications; detecting (806) one of: i) a loss in main power availability or ii) a command to implement a power saving mode of operation; and switching (818) to a first power saving mode of operation in response to: i) detecting a command to implement a power saving mode of operation or ii) detecting a loss of main power availability, said first power saving mode of operation being a mode of operation in which said first laser is powered off for at least a first period of time.

While a laser may be, and sometimes is, powered down during at least some period of time during power save mode of operation, the methods and apparatus still allow for device availability in at least some embodiments where detection of an off-hook condition of a telephone or other device at a customer premise is detected and trigger powering up of at least one laser and/or resumption of normal mode operation. In one such embodiment once an on-hook condition of the device, e.g., phone, which was detected going off hook during power saving mode operation, and thus triggering powering of the laser, is detected as going on hook power saving mode is resumed and the laser is powered off, e.g., for a period of time and/or according to a schedule.

By supporting power saving mode operation, the methods and apparatus of the invention allow for use of a backup battery which can be of a reasonable size for a residential application while still allowing for 24 hour availability for voice calls during power outages and/or emergencies. The methods and apparatus can also be used to facilitate reaching of voluntary small network equipment power consumption targets and/or government mandated power consumption requirements for residential device in the event they are implemented or already exist.

Significantly, while an optical network unit implemented in accordance with the invention may enter a power saving mode of operation, the ONU can remain registered with a network device such as an OLT in at least some embodiments. After an initial registration with an OLT, e.g., after power up, the ONU is able to support voice calls. In one such embodiment the OLT keeps the ONU registered even though it may temporarily cease to communicate with the ONU due to ONU power saving mode operation and depowering of the ONU's laser or lasers and/or optical receivers for a period of time. In such embodiments on powering up its laser or lasers and/or optical receiver(s), the ONU can proceed with communicating with the OLT and proceeding with a voice call without having to re-register. This allows for rapid voice call support even when an ONU switches from power saving to powered operation in response to a device such as a phone going off hook allowing for rapid placement of calls, e.g., in emergencies, since re-registration can be avoided as compared to embodiments where an ONU needs to re-register after ceasing communication with an OLT, e.g., due to a laser or receiver being powered off.

In some embodiments, the processor or processors, e.g., CPUs, of one or more devices, are configured to control the devices, e.g., optical line terminal or customer premises device including an optical modem, in which they are located to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. The components in devices may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as an optical line terminal or optical modem. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a customer premises device including an optical modem including at least a first laser, the method comprising:
   operating in a normal mode of operation in which the first laser is continuously powered on for upstream communications;
   detecting one of: i) a loss in main power availability or ii) a command to implement a power saving mode of operation;
   communicating to an optical line terminal (OLT) that the customer premises device is switching to the first power saving mode of operation;
   switching to a first power saving mode of operation in response to: i) detecting a command to implement a power saving mode of operation or ii) detecting a loss of main power availability, said first power saving mode of operation being a mode of operation in which said first laser and a corresponding first optical receiver in the customer premises device is powered off for at least a first period of time, and wherein switching to the first power saving mode of operation includes: turning off power to the first laser and the first optical receiver.

2. The method of claim 1, further comprising:
   receiving from the OLT scheduling information indicating said first period of time; and
   wherein the customer premises device remains registered with the OLT during said first period of time in which the first laser and first optical receiver are powered off.

3. The method of claim 1, further comprising:
   maintaining the first laser used for upstream communication and the first optical receiver in a powered off state for the first period of time.

4. The method of claim 3, further comprising:
   determining expiration of said first period of time; and
   providing power to the first laser and the first optical receiver at the end of said first period of time.

5. The method of claim 4, wherein said customer premises device includes a plurality of lasers used for upstream communication and wherein said first laser is one of said plurality of lasers used for upstream communication.

6. The method of claim 5, wherein switching to a first power saving mode of operation includes turning off power to each of said plurality of lasers used for upstream communication.

7. The method of claim 3,
   wherein said customer premises device is an optical network unit (ONU);
   wherein said ONU includes three laser and optical receiver pairs;
   wherein said first laser and first optical receiver are a first laser and optical receiver pair of said ONU; and
   wherein the method further comprises:
   supporting multiple different power saving modes of operation including the first power saving mode of operation and a second power saving mode of operation, supporting multiple different power saving modes of operation including powering off at least one laser and optical receiver pair during the first power saving mode of operation and powering off multiple laser and optical receiver pairs during the second power saving mode of operation.

8. The method of claim 7, further comprising:
   transmitting, while in the first power saving mode of operation, data to the OLT using a laser of a second laser and optical receiver pair while the first laser and optical receiver of the first laser and optical receiver pair is powered off.

9. The method of claim 1, further comprising:
   receiving from the OLT scheduling information indicating said first period of time.

10. The method of claim 9, further comprising:
    sending, after expiration of said first period of time, a message to the OLT indicating that the customer premises device is active.

11. The method of claim 10, further comprising:
    exchanging, while in the first power saving mode of operation, at least some data with the OLT using a second laser and optical receiver pair.

12. The method of claim 1, further comprising:
    detecting one of: i) a change in main power availability indicating that main power has been restored and is available or ii) a command to implement the normal mode of operation.

13. The method of claim 12, further comprising:
    switching to normal mode of operation in response to detecting one of: i) a change in main power availability indicating that main power has been restored and is available or ii) a command to implement the normal mode of operation.

14. A customer premises device, the customer premises device comprising:
    a first laser for upstream communication;
    a first optical receiver for downstream communication;
    a power monitoring circuit configured to monitor main power availability; and
    a processor configured to:
      operate the customer premises device in a normal mode of operation in which the first laser is continuously powered on for upstream communications;
      detect one of: i) a loss in main power availability or ii) a command to implement a power saving mode of operation;
      communicate to an optical line terminal (OLT) that the customer premises device is switching to the first power saving mode of operation; and
      switch to a first power saving mode of operation in response to: i) detecting a command to implement a power saving mode of operation or ii) detecting a loss of main power availability, said first power saving mode of operation being a mode of operation in which said first laser and a corresponding first optical receiver in the customer premises device is powered off for at least a first period of time, and wherein said switch to the first power saving mode of operation includes turning off power to the first laser and corresponding first optical receiver.

15. The customer premises device of claim 14, wherein said processor is further configured to operate the customer premises device to:
    receive from the OLT scheduling information indicating said first period of time.

16. The customer premises device of claim 14, wherein said processor is configured to:
    maintain the first laser used for upstream communication in a powered off state for the first period of time.

17. The customer premises device of claim 16, wherein said processor is further configured to:
    determine expiration of said first period of time; and
    provide power to the first laser at the end of said first period of time.

18. The customer premises device of claim 17, further comprising:
one or more additional lasers used for upstream communications, wherein said first laser and said one or more additional lasers used for upstream communications are a plurality of lasers used for upstream communications.

19. The customer premises device of claim 18,
wherein said customer premises device is an optical network unit (ONU);
wherein said ONU includes three laser and optical receiver pairs;
wherein said first laser and first optical receiver are a first laser and optical receiver pair of said ONU; and
wherein said processor is configured to:
support multiple different power saving modes of operation by controlling laser and optical receiver pairs, said supporting multiple different power saving modes of operation including supporting a first power saving mode of operation and a second power saving mode of operation, said processor powering off at least one laser and optical receiver pair during the first power saving mode of operation and powering off multiple laser and optical receiver pairs during the second power saving mode of operation.

20. A non-transitory computer readable medium including computer executable instructions which when executed by a processor of a customer premises device including an optical modem including at least a first laser cause the customer premises device to perform the steps of:
operating in a normal mode of operation in which the first laser is continuously powered on for upstream communications;
detecting one of: i) a loss in main power availability or ii) a command to implement a power saving mode of operation;
communicating to an optical line terminal (OLT) that the customer premises device is switching to the first power saving mode of operation; and
switching to a first power saving mode of operation in response to: i) detecting a command to implement a power saving mode of operation or ii) detecting a loss of main power availability, said first power saving mode of operation being a mode of operation in which said first laser and a corresponding first optical receiver is powered off for at least a first period of time, and wherein switching to the first power saving mode of operation includes: turning off power to the first laser and corresponding first optical receiver.

\* \* \* \* \*